United States Patent [19]

Hasegawa et al.

[11] Patent Number: 5,128,923
[45] Date of Patent: Jul. 7, 1992

[54] DISC CARTRIDGE FOR CLEANING AN OBJECTIVE LENS

[75] Inventors: Hiroyuki Hasegawa, Saitama; Takashi Naito, Kanagawa; Mineaki Suzuki, Tokyo; Hironari Hoshino, Kanagawa, all of Japan

[73] Assignee: Sony Corporation, Tokyo, Japan

[21] Appl. No.: 642,235

[22] Filed: Jan. 16, 1991

[30] Foreign Application Priority Data

Jan. 19, 1990 [JP] Japan ............................... 2-9636
Sep. 20, 1990 [JP] Japan ............................... 2-251351

[51] Int. Cl.⁵ .............. G11B 3/58; G11B 5/02; G11B 5/10; G11B 23/50
[52] U.S. Cl. ...................... 369/292; 369/71; 369/72; 360/128; 15/160
[58] Field of Search .................. 369/71, 72, 73, 74, 369/292; 360/128; 15/DIG. 12, DIG. 13, DIG. 14, 160

[56] References Cited

U.S. PATENT DOCUMENTS 4,870,636 9/1989 Yamamoto ............... 369/71 X

FOREIGN PATENT DOCUMENTS

| 0248908 | 12/1987 | European Pat. Off. |
| 012046 | 2/1988 | Japan . |
| 012396 | 10/1988 | Japan . |
| 0313378 | 12/1988 | Japan ............... 369/72 |
| 013007 | 1/1989 | Japan . |
| 0105371 | 4/1989 | Japan ............... 369/72 |
| 013212 | 5/1989 | Japan . |
| 013397 | 9/1989 | Japan . |
| 0049284 | 2/1990 | Japan ............... 369/72 |

Primary Examiner—Stuart S. Levy
Assistant Examiner—Tien Ba Pham
Attorney, Agent, or Firm—Lewis H. Eslinger; Jay H. Maioli

[57] ABSTRACT

An objective lens cleaning cartridge for an optical disc drive apparatus is comprised of a cartridge body, and a cleaning member freely protruding from and retractable into the cartridge body in unison with a loading operation of the cartridge body into the disc drive apparatus, the cleaning member being slidably in contact with an objective lens of an optical pickup device provided within the disc drive apparatus.

8 Claims, 19 Drawing Sheets

DISC CARTRIDGE FOR CLEANING AN OBJECTIVE LENS

BACKGROUND OF THE INVENTION

1. Field of the Invention

The present invention generally relates to disc cartridges and, more particularly, is directed to a disc cartridge for cleaning an objective lens of a disc drive apparatus of an optical disc recording and reproducing apparatus for recording and/or reproducing discs, such as an optical disc, a magneto-optical disc and so on.

2. Description of the Prior Art

In a recent optical disc system, in order to protect a signal recording surface of a disc, an optical disc cartridge system is realized, in which an optical disc is accommodated within a disc cartridge and the optical disc is loaded onto a disc drive apparatus, thereby being recorded and/or reproduced under the condition such that the optical disc is accommodated within the disc cartridge.

In this optical disc cartridge system, when the disc cartridge is repeatedly loaded onto the disc drive apparatus, an objective lens of an optical pickup device within the disc drive apparatus is smudged by dust or the like. There is then the risk that the normal recording and/or reproduction will be hindered.

To remove such disadvantage, various cartridge type cleaners for cleaning the objective lens of the optical pickup, i.e., a cartridge for cleaning an objective lens, have been proposed so far. For example, brushes are implanted on the outer surface of, for example, an ordinary disc cartridge and this cartridge is inserted into the disc drive apparatus so that, after the loading operation is finished, an optical pickup device is moved to clean its objective lens; and brushes are implanted on a disc accommodated within a cartridge and this cartridge is inserted into the disc drive apparatus so that, after the loading operation is finished, the disc is rotated to clean the objective lens.

However, the above-mentioned previously-proposed cleaning cartridge is of the type such that the objective lens is cleaned by utilizing the movement of the optical pickup device or by utilizing the rotation of the disc, so that in such case the cleaning operation needs an electrical driving force. In other words, if the power switch of the disc drive apparatus is not turned ON, the cleaning operation cannot be performed. Further, in the latter cleaning cartridge utilizing the rotation of the disc, the disc is rotated at high speed, and unavoidably, there is then the risk that the objective lens will be damaged by the brushes, which brings about a serious problem in actual practice.

To solve the aforementioned problems, the assignee of the present application has previously proposed the following cleaning cartridge (see Japanese Utility Model Application No. 1-42568).

According to this previously-proposed cleaning cartridge, there is provided a disc drive optical pickup cleaning cartridge which utilizes a disc cartridge having a correct insertion detecting portion by which when the disc cartridge is correctly inserted into the disc drive apparatus, a disc cartridge locking mechanism is operated to lock the thus inserted disc cartridge. This cleaning cartridge is provided with a cleaning member, for example, a brush formed along the insertion direction of the cartridge and is not provided with the correct insertion detecting portion.

When this cleaning cartridge is inserted into the disc drive side, the top of the brush comes in contact with the objective lens of the optical pickup device to clean the objective lens. Further, the correct insertion detecting portion is not to provided so that, if the cartridge is inserted into the innermost portion, the cartridge is not locked and ejected again. By this loading and/or unloading operation of the cartridge, the optical pickup device can be cleaned without the electrical driving force.

In the thus constructed cleaning cartridge, the brush is secured to the cartridge as the cleaning member and is also protruded from the outer surface of the cartridge so that, when the cartridge is inserted into the disc drive apparatus, the brush is brought in contact with a member which is located at the insertion entrance side relative to the objective lens, e.g., a disc turntable or the like. As a consequence, before removing smudges of the objective lens, the brush is smudged by dust or the like on the turntable, dust within an opening portion of the turntable shaft or the like. There is then the risk that the objective lens will be smudged by such dust or the like.

OBJECTS AND SUMMARY OF THE INVENTION

Accordingly, it is an object of the present invention to provide an improved cartridge for cleaning an objective lens in which the aforenoted shortcomings and disadvantages encountered with the prior art can be eliminated substantially.

More specifically, it is an object of the present invention to provide a cartridge for cleaning an objective lens in which by the insertion loading operation of the cartridge onto the disc drive apparatus, a cleaning member is brought in slidable contact with only an objective lens so that the objective lens can be cleaned reliably.

It is another object of the present invention to provide a cartridge for cleaning an objective lens in which a disc drive mechanism can be cleaned at the same time when an objective lens is cleaned.

It is a further object of the present invention to provide a cartridge for cleaning an objective lens in which an objective lens can be prevented from being electrified after having been cleaned by the slidable movement of a cleaning member.

The above, and other objects, features and advantages of the present invention will become apparent in the following detailed description of preferred embodiments thereof to be taken in conjunction with the accompanying drawings, in which like reference numerals are used to identify the same or similar parts in the several views.

DETAILED DESCRIPTION OF THE PREFERRED EMBODIMENTS

The present invention will now be described in detail with reference to the accompanying drawings.

Prior to explaining an arrangement of an embodiment of a cartridge for cleaning an objective lens according to the present invention, an optical disc cartridge system to which the present invention is applied will hereinafter be described with reference to FIGS. 1 to 6. In that event, let us explain the optical disc cartridge system that the assignee of the present application has previously proposed (see Japanese Utility Model Application No. 59-180502).

Figure 2:
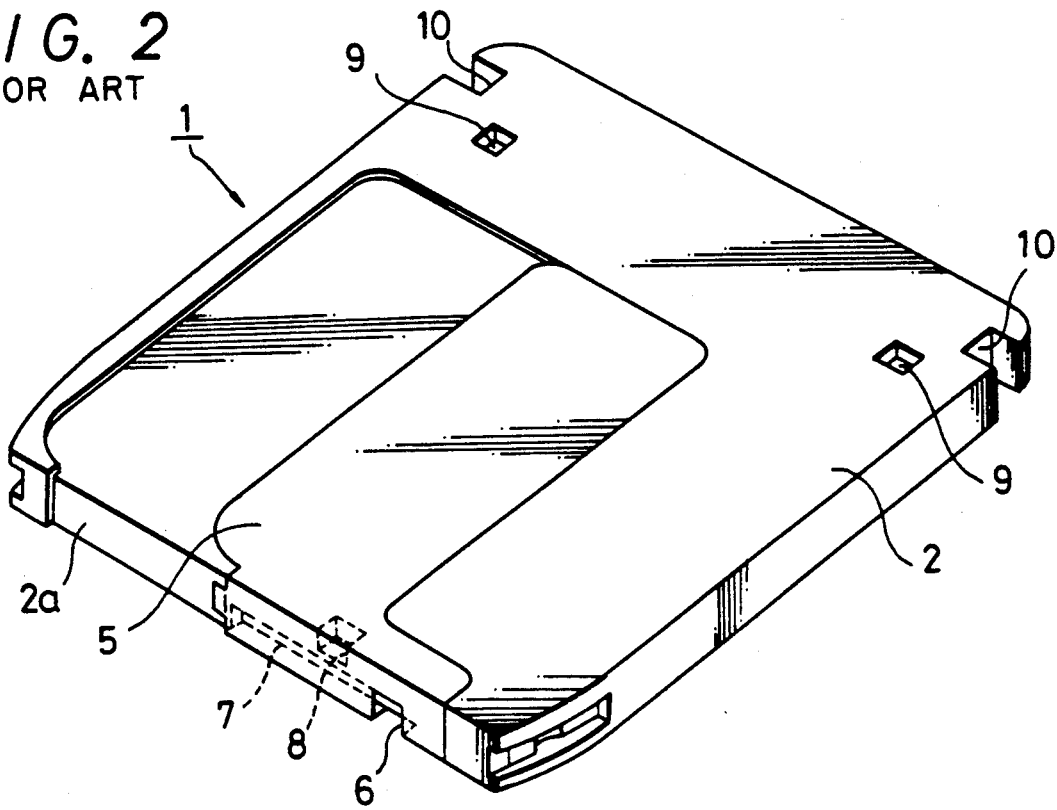
FIG. 2 is a perspective view of an ordinary disc cartridge with its shutter closed.
Figure 3:
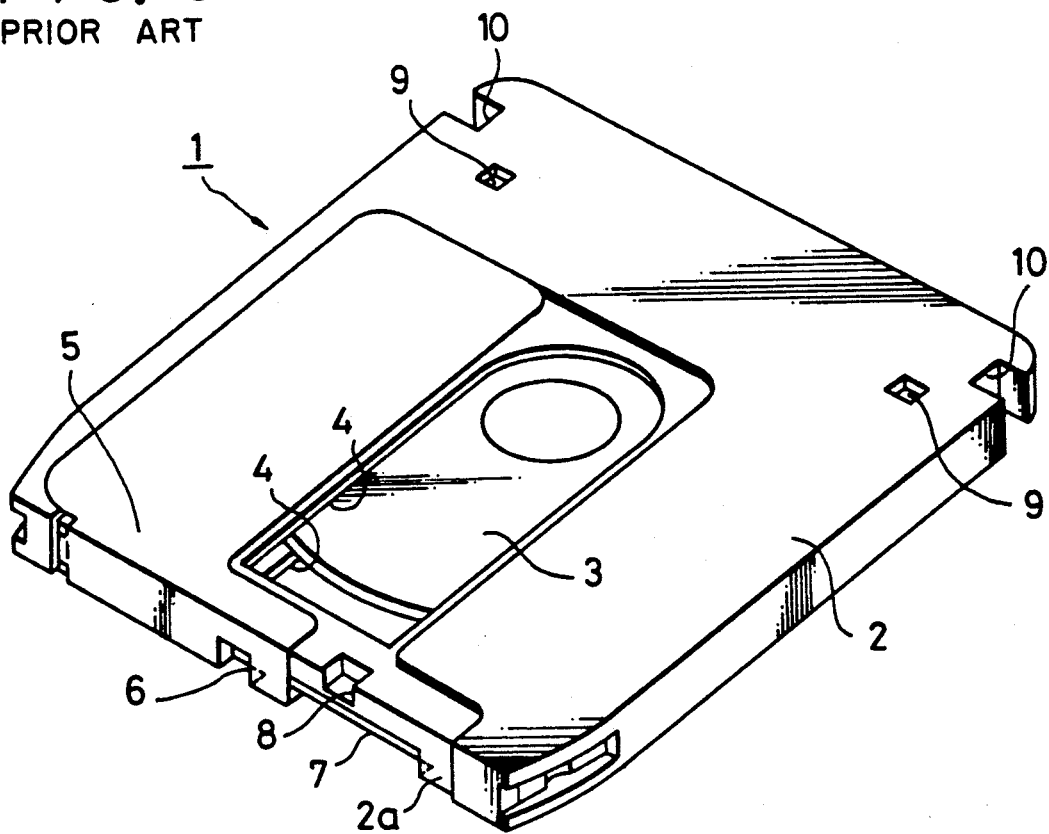
FIG. 3 is a perspective view of the ordinary disc cartridge with its shutter opened.

FIGS. 2 and 3 show an example of a disc cartridge 1 which is generally utilized in this optical disc cartridge system. As shown in FIGS. 2 and 3, this disc cartridge 1 includes a cartridge housing 2 made of, for example, resin in which an optical disc (e.g., magneto-optical disc) 3 is accommodated so as to be freely rotatable. The outer dimension of this disc cartridge 1 is decided in accordance with international standards, that is, this disc cartridge 1 is what might be called a 5.25-inch optical disc cartridge.

This disc cartridge 1 is of the double-sided type, that is, the disc 3 has signal recording surfaces provided on its upper and lower sides. The disc cartridge housing 2 has opening portions 4 formed at its upper and lower sides in association with the upper and lower signal recording surfaces so that, when this disc cartridge 1 is loaded onto the disc drive apparatus, an optical pickup is opposed to the signal recording surface of the disc 3 through the opening portion 4 so as to write and read a signal in and from the recording surface of the disc 3.

A shutter 5 is provided in the cartridge housing 2 so as to become slidable in the lateral direction of the cartridge housing 2 in order to open and/or close the opening portions 4 formed through the upper and lower surfaces. This shutter 5 is shaped substantially U-letter configuration in cross section by bending, for example, a metal plate so that it may cover the front surface portion and the upper and lower surface portions of the cartridge housing 2. In the normal condition, the shutter 5 is located at the closing position so as to close the opening portions 4. This shutter 5 has formed at a front wall portion thereof an engaging recess 6 used to open and/or close the shutter 5. More specifically, a shutter opening and closing pin (not shown) provided at the disc drive apparatus is engaged into this engaging recess 6, thereby the shutter 5 being opened and/or closed.

In association with the engaging recess 6 of the shutter 5, the cartridge housing 2 has formed at the front wall portion 2a thereof a stepped portion 7 of concave configuration into which the shutter opening and closing pin is escaped when the shutter opening and closing pin is engaged into the engaging recess 6.

Further, the cartridge housing 2 has formed at the front wall portion 2a thereof a concave portion 8 as a regular insertion detecting portion which is used to prevent a misinsertion of the disc cartridge 1 as will be described later. This concave portion 8 is located such that, when the shutter 5 is in its normal closed condition, it is converted with the shutter 5, while when the shutter 5 is opened, it is exposed.

Openings 9 are bored through the top of the cartridge housing 2 so as to determine the position of the disc cartridge 1 when the disc cartridge 1 is loaded onto the disc drive apparatus. Gripper concave portions 10 are formed through the side walls of the cartridge housing 2 to help the user to take out the disc cartridge 1 from the disc drive apparatus with his fingers.

A shutter locking mechanism is incorporated within the disc cartridge 1 so that, when the shutter 5 is in its closed condition, the shutter 5 is locked by the shutter locking mechanism and that, when the shutter opening and closing pin is inserted into the engaging recess 6, the shutter 5 locked by the shutter locking mechanism is released. This shutter locking mechanism is not so important to understand the present invention and therefore need not be described and shown.

An arrangement of the disc drive apparatus 11 into which the disc cartridge 1 is loaded will be explained below.

Figure 1:
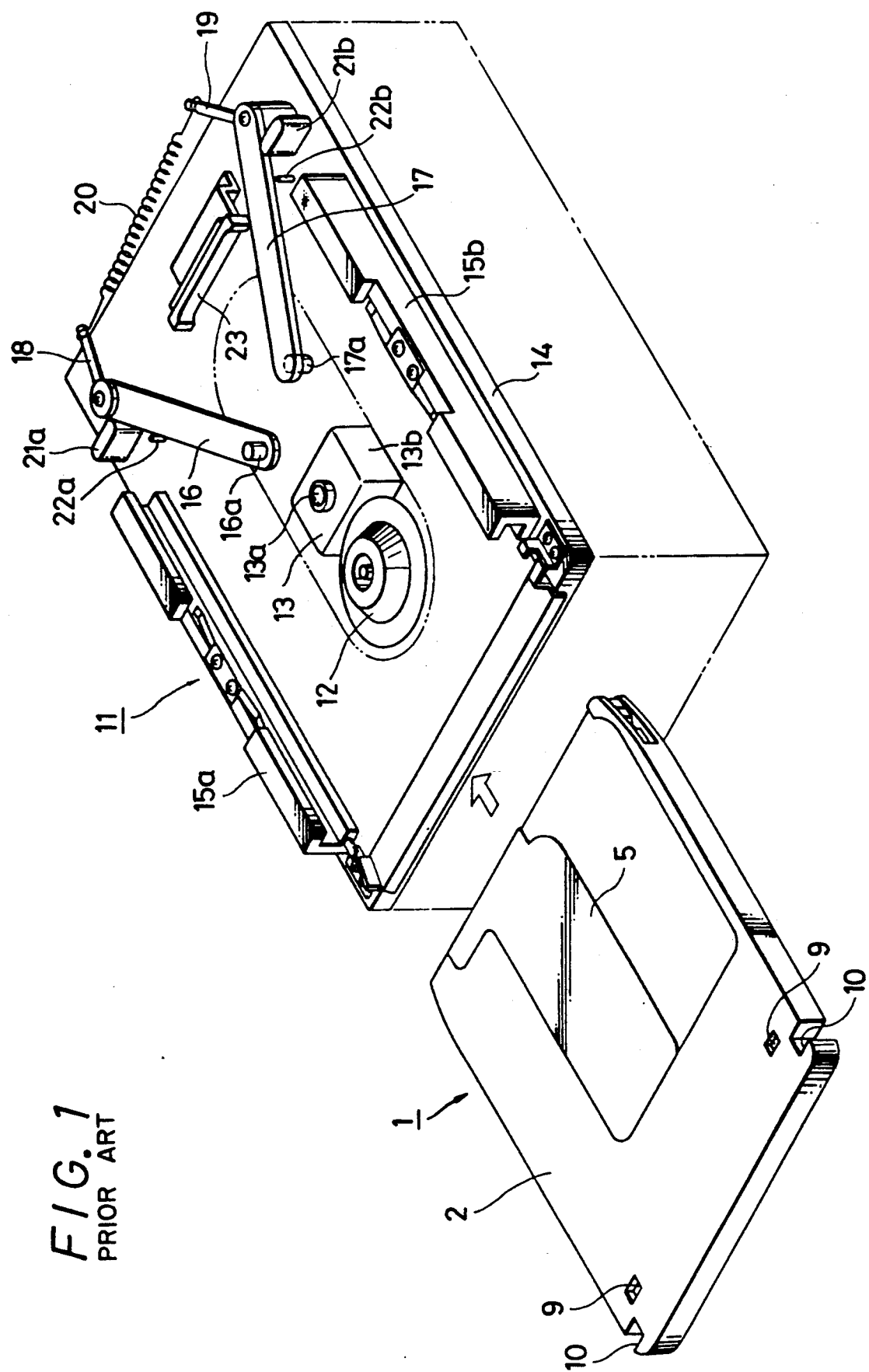
FIG. 1 is a perspective view illustrating an example of a disc drive apparatus.

Referring to FIG. 1, a turntable 12 is provided in order to rotate the disc 3 within the disc cartridge 1 loaded onto the disc drive apparatus 11, and an optical pickup device 13 is provided to oppose the recording surface of the disc 3, the optical pickup device 3 being movable along the radius direction of the disc 3. An objective lens 13a is provided on the upper surface side of the optical pickup device 13 to emit a laser light or beam by which a signal is written in and/or read out from the recording surface of the disc 3. A lens cover 13b of the optical pickup device 13 is made of a conductive metal, such as aluminum.

The disc cartridge 1 is supported on a supporting base plate 14, and this supporting base plate 14 is vertically movably supported to a stationary base plate on which the turntable 12 and the optical pickup device 13 are secured. The supporting base plate 14 has secured at left and right side end portions thereof opposing supporting rails 15a and 15b of U-letter configurations in cross section, and the two side portions of the disc cartridge 1 are supported by the two supporting rails 15a and 15b when the disc cartridge 1 is loaded onto the disc drive apparatus 11.

On the rear portion of the supporting base plate 14, a first shutter opening and closing arm 16 and a second shutter opening and closing arm 17 are pivoted symmetrically with respect to the right and left direction and in an opposing relation to the insertion direction of the disc cartridge 1 to thereby open and close the shutter 5 of the disc cartridge 1. The first and second shutter arms 16 and 17 are displaced from each other in the height direction by the amount larger than the thickness of the disc cartridge 1. That is, the first shutter arm 16 is located at the position lower than the disc cartridge 1 which is loaded onto the disc drive apparatus 11, and the second shutter arm 17 is located at the position higher than the above-mentioned disc cartridge 1. The first shutter arm 16 has implanted on a free end thereof a shutter opening and closing pin 16a which is protruded upwardly, and the second shutter opening and closing arm 17 has implanted on a free end thereof a shutter opening and closing pin 17a which is protruded downwardly.

The first and second shutter opening and closing arms 16 and 17 have at the pivot base end portions thereof spring engaging portions 18 and 19 protruded rearwardly, and a tension spring 20 is extended between the top portions of the spring engaging portions 18 and 19. Therefore, by the spring biasing force of the tension spring 20, the two shutter opening and closing arms 16 and 17 are spring-biased in the direction in which the shutter opening and closing pins 16a and 17a become distant from each other.

The two shutter opening and closing arms 16 and 17 are held at predetermined rotating positions by arm rotation restricting members 21a and 21b which are both secured on the supporting base plate 14.

Further, left and right cartridge insertion restricting protrusions 22a and 22b are protruded from the rear portion of the supporting base plate 14 so that, when the disc cartridge 1 is fully inserted into the disc drive apparatus 11, the front wall portion of the disc cartridge 1 is brought in contact with the cartridge insertion restricting protrusions 22a and 22b, thereby being engaged therewith.

A stopper 23 is provided on the center of the rear portion of the supporting base plate 14. As will be described later, when the disc cartridge 1 is erroneously inserted into the disc drive apparatus 11, this stopper 23 abuts against the shutter opening and closing pins 16a and 17a of the first and second shutter opening and closing arms 16 and 17 to thereby prevent the disc cartridge 1 from being erroneously inserted into the disc drive apparatus 11.

An operation in which the disc cartridge 1 is inserted into the thus arranged disc drive apparatus 11 will be described with reference to FIGS. 4 to 6.

Figure 4:
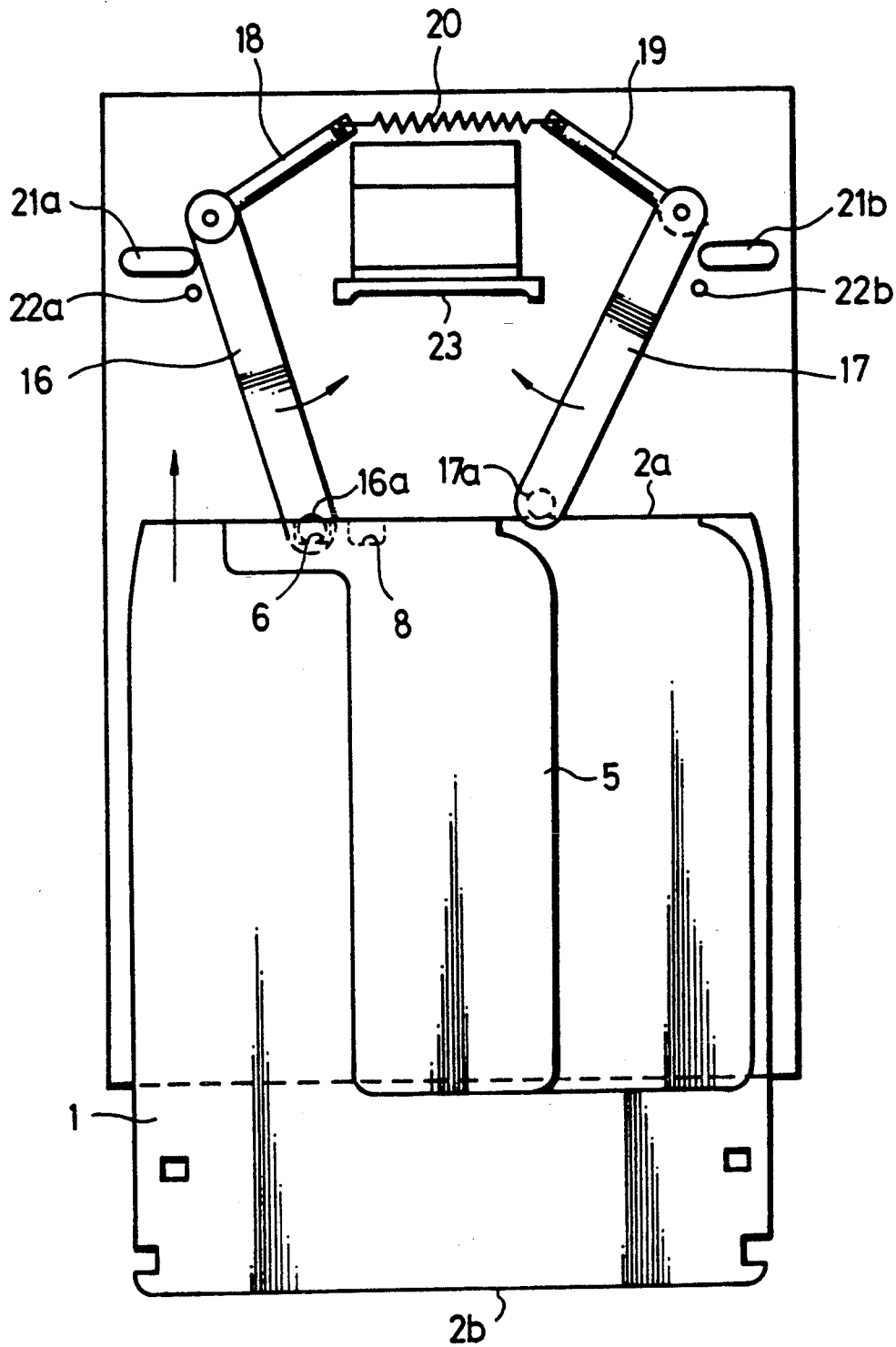
FIGS. 4 and 5 are respectively plan views used to explain the correct insertion operation of the disc cartridge into the disc drive apparatus.

When the disc cartridge 1 is correctly inserted into the disc drive apparatus 11 from the cartridge housing front wall portion 2a side turning its one side (e.g., so-called side A) toward the upward, as shown in FIG. 4, the shutter opening and closing pin 16a of the first shutter opening and closing arm 16 is engaged into the engaging recess 6 of the shutter 5 whereas the shutter opening and closing pin 17a of the second shutter opening and closing arm 17 is brought in contact with the front wall portion 2a of the disc cartridge 1. If the disc cartridge 1 is further pushed into the disc drive apparatus 11 from this state, by this pushing force, the two shutter opening and closing arms 16 and 17 are rotated rearwardly against the spring-biasing force of the tension spring 20. At that time, in accordance with the rotation of the first shutter opening and closing arm 16, the shutter opening and closing pin 16a acts to move the shutter 5 from the closed position to the opened position whereas the shutter opening and closing pin 17a of the second shutter opening and closing arm 17 is slid along the front wall portion 2a of the disc cartridge 1 and the front wall portion of the shutter 5 independently of the opening operation of the shutter 5.

Figure 5:
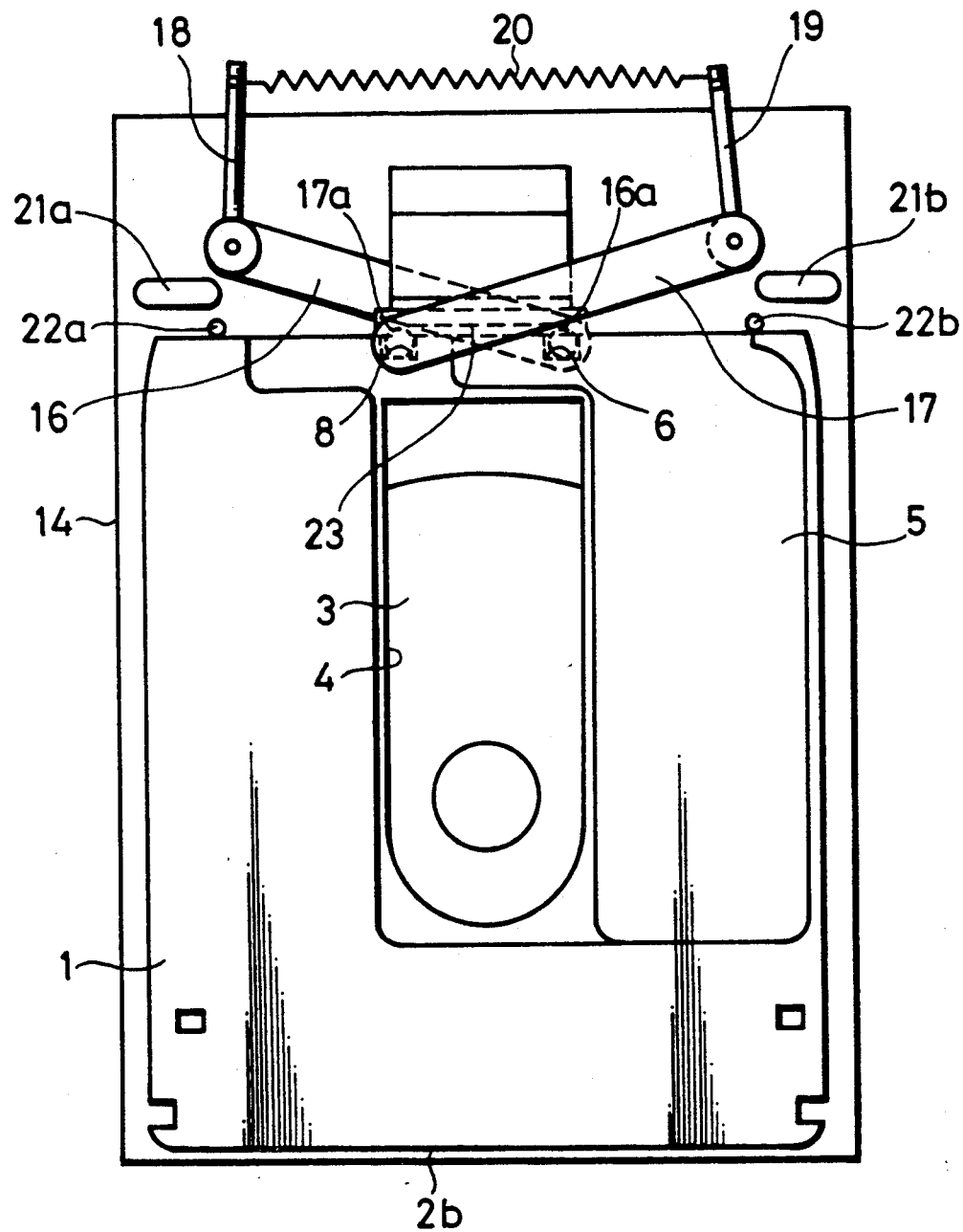
Figure 6:
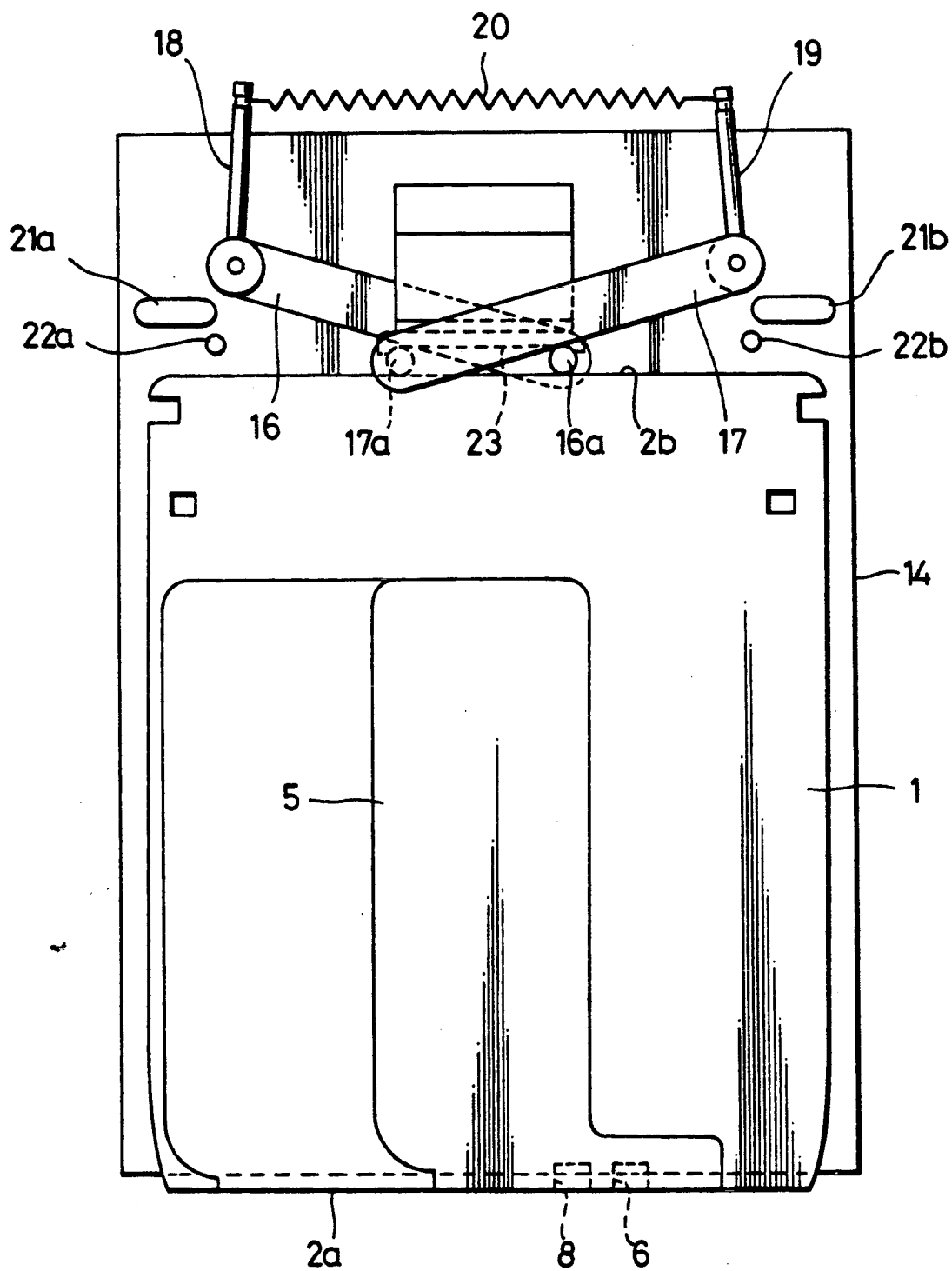
FIG. 6 is a plan view used to explain the condition such that the disc cartridge is erroneoulsy inserted into the disc drive apparatus.
Figure 7:
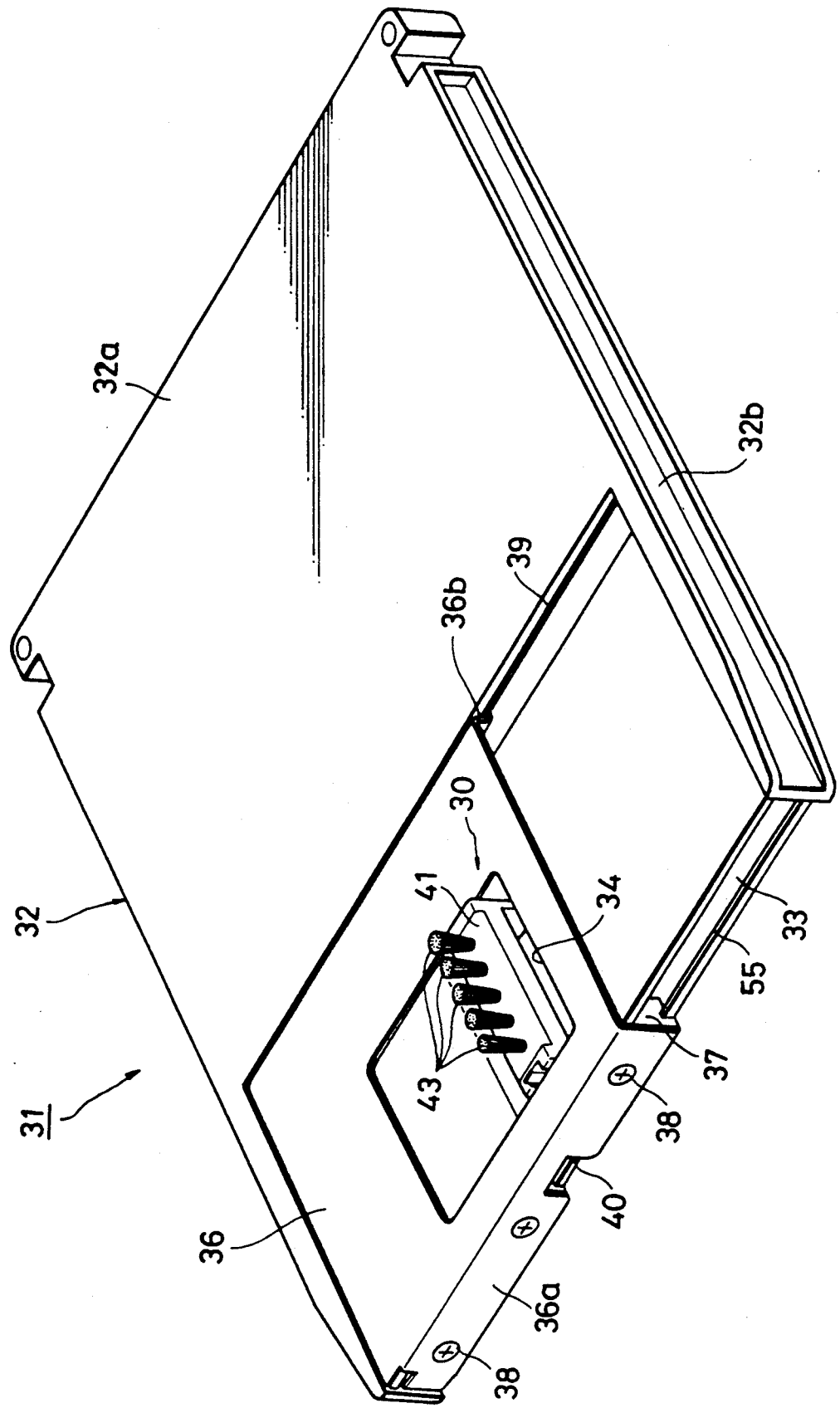
FIG. 7 is a perspective view of a first embodiment of a cleaning cartridge according to the present invention and illustrating from the lower surface side thereof the condition that a cleaning member is protruded.
Figure 8:
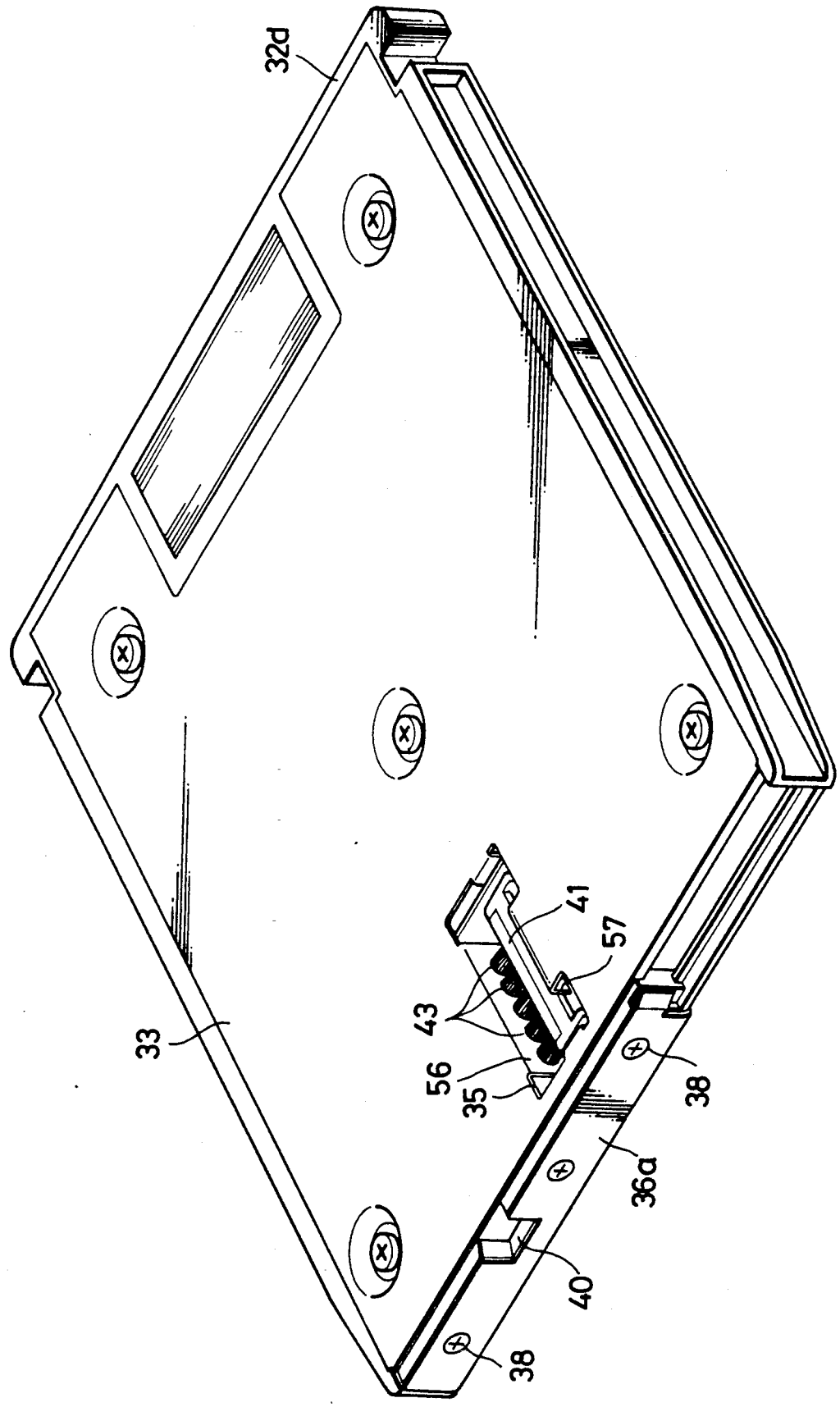
FIG. 8 is a perspective view of the first embodiment of the cleaning cartridge according to the present invention and illustrating from the upper surface side thereof the condition that the cleaning member is retracted into the cartridge body.
Figure 9:
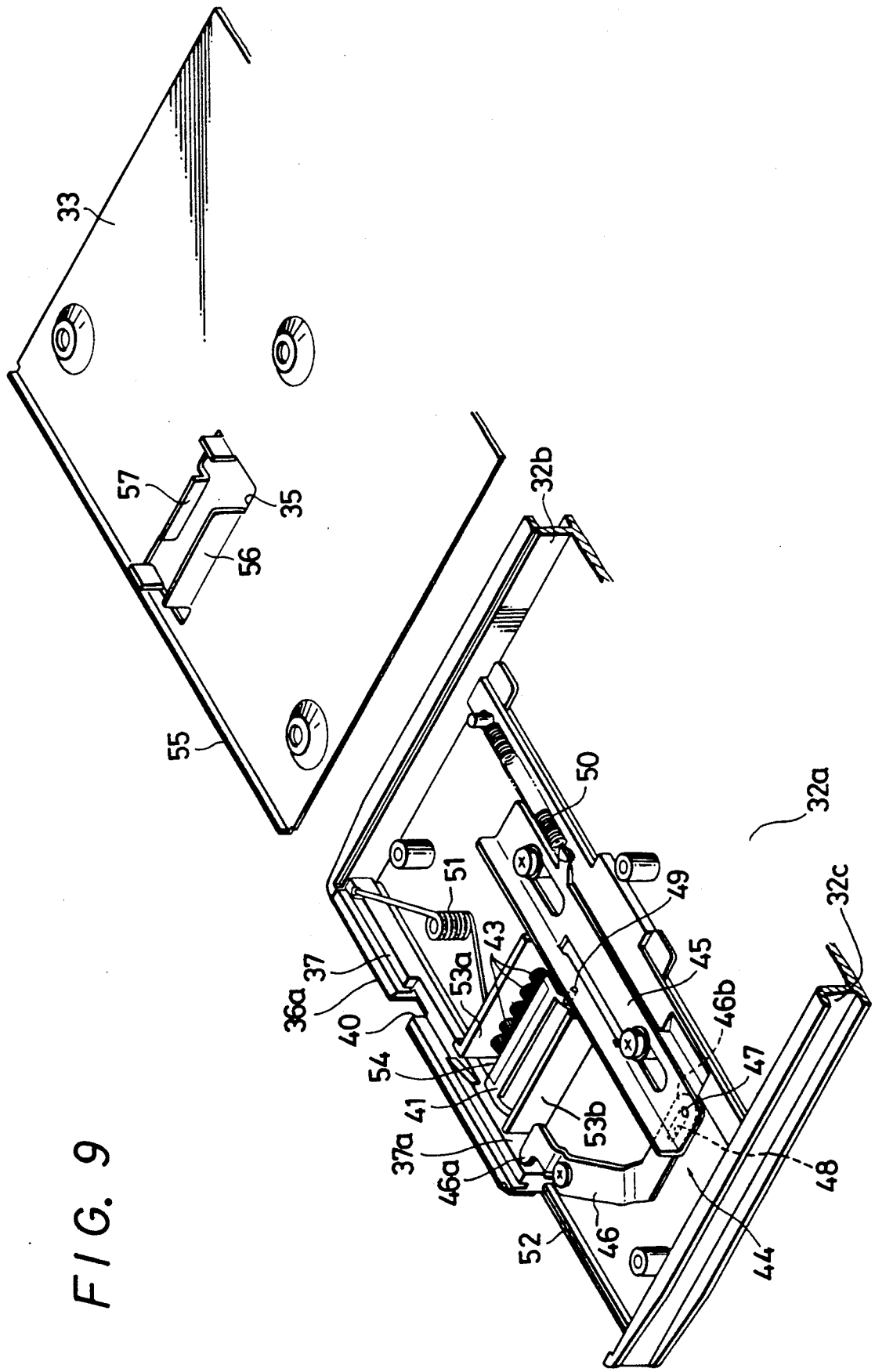
FIG. 9 is a fragmentary, exploded view of a main portion of the cleaning cartridge of the present invention.

When the disc cartridge 1 is inserted into the innermost portion of the disc drive apparatus 11, as shown in FIG. 5, the shutter 5 is completely moved to the opening position to thereby open the opening portion 4 wholly. In this state, the shutter opening and closing pin 17a of the second shutter opening and closing arm 17, which is not concerned with the opening operation of the shutter 5, is entered into the concave portion 8 of the disc cartridge 1, whereby the front wall portion 2a of the disc cartridge 1 is brought in contact with the cartridge insertion restricting protrusions 22a and 22b without being disturbed by the shutter opening and closing pin 17a, that is, the disc cartridge 1 is completely inserted into the disc drive apparatus 11 at its predetermined loading position.

When the disc cartridge 1 is perfectly inserted into the disc drive apparatus 11, a cartridge locking mechanism (not shown) is operated to lock the disc cartridge 1 so that the disc cartridge 1 cannot be moved. Then, the entire supporting substrate 14 is lowered to place the disc 3 accommodated within the disc cartridge 1 on the turntable 12, thus the loading operation being completed.

If on the other hand the disc cartridge 1 is correctly inserted into the disc drive apparatus 11 from the front wall portion 2a side under the condition that the disc cartridge 11 is turned over, that is, the disc cartridge 1 is inserted thereinto with its reverse surface (i.e., so-called side B) facing upward, the shutter opening and closing pin 17a of the second shutter opening and closing arm 17 is engaged with the engaging recess 6 of the shutter 5 whereas the shutter opening and closing pin 16a of the first shutter opening and closing arm 16 comes in contact with the front wall portion 2a of the disc cartridge 1.

When the disc cartridge 1 is further pushed into the disc drive apparatus 11 from this state to thereby rotate the two shutter opening and closing arms 16 and 17 in the rearward, the shutter 5 is moved in its opening direction by the shutter opening and closing pin 17a of the second shutter opening and closing arm 17 whereas the shutter opening and closing pin 16a of the first shutter opening and closing arm 16 is slid along the front wall portion 2a of the disc cartridge 1 without being affected by the opening operation of the shutter 5. When the disc cartridge 1 is inserted into the innermost portion of the disc drive apparatus 11, the shutter opening and closing pin 16a, which is not related to the opening operation of the shutter 5, is entered into the concave portion 8 with the result that the disc cartridge 1 is completely inserted into the disc drive apparatus 11, thus being locked at that position.

If the disc cartridge 1 is not correctly inserted into the disc drive apparatus 11 from its front wall portion 2a side such as when the disc cartridge 1 is erroneously inserted into the disc drive apparatus 11 from the opposite direction, that is, from its rear wall portion 2b side, the shutter 5 is not moved at all and the shutter opening pins 16a and 17a are merely slid along the rear wall portion 2b of the disc cartridge 1, thereby the two shutter opening and closing arms 16 and 17 being rotated in the rearward. Under the condition that the disc cartridge 1 is inserted into the innermost portion of the disc drive apparatus 11, as shown in FIG. 5, the two shutter opening and closing pins 16a and 17a abut against the stopper 23 before the disc cartridge 1 comes in contact with the the cartridge insertion restricting protrusions 22a and 22b, that is, the shutter opening and closing pins 16a and 17a are sandwiched between the disc cartridge 1 and the stopper 23 because the rear wall portion 2b of the disc cartridge 1 has no concave portion and so on into which the shutter opening and closing pins 16a and 17a can enter. As a consequence, the disc cartridge 1 is blocked by the shutter opening and closing pins 16a and 17a so that it cannot be inserted into the disc drive apparatus 11 at its predetermined loading position. Accordingly, since the cartridge locking mechanism is not operated, the disc cartridge 1 is ejected to prevent the disc cartridge 1 from being erroneously inserted into the disc drive apparatus 11.

The present invention relates to a cleaning cartridge for cleaning an objective lens of an optical pickup device of an optical disc drive apparatus in the thus arranged optical disc cartridge system. An embodiment of the present invention will now be described in detail with reference to FIGS. 7 to 13.

As illustrated, there is provided a cartridge 31 which is substantially the same as the aforenoted disc cartridge 1 in size. This cartridge 31 is composed of a housing-shaped main body 32 made of synthetic resin and which is formed of a bottom portion 32a, two side walls 32b, 32c, a rear wall 32d and a lid plate 33 made of a conductive metal and which covers the upper surface side of this housing-shaped main body 32. Opening portions 34 and 35 are formed through the bottom portion 32a and the front center portion of the lid plate 33 of the housing-shaped main body 32, that is, the portions corresponding to the first half portions of the opening portion 4 of the disc cartridge 1 through which the optical pickup device opposes. A shutter 36 which opens and-/or closes the opening portion 34 of the housing-shaped main body 32 is secured to a slider 37 slidable between the front edges of the housing-shaped main body 32 and the lid plate 33 in the lateral direction at its bent front surface 36a by screws 38. Also, a rear edge 36b of the shutter 36 is engaged with a guide groove 39 formed in the lateral direction of the bottom portion 32a of the housing-shaped main body 32, thus the shutter 36 being slidable in the lateral direction.

An engaging recess portion 40 is formed from the front surface side of the shutter 36, that is, the bent front surface 36a to the slider 37 so as to open and close the shutter 36 from the upper surface side. As in the shutter 5 of the aforementioned disc cartridge 1, when a shutter opening and closing pin of the disc drive apparatus side, that is, the shutter opening and closing pin 17a of the second shutter opening and closing arm 17 in the aforementioned disc drive apparatus 11 is inserted into the above-mentioned engaging recess 40, the shutter 36 is opened and/or closed.

As described above, a cleaning member 30 is added to the cartridge 31 which is substantially the same as the aforenoted disc cartridge 1 both in size and in shape, thus constructing a cleaning cartridge.

More specifically, in the inside of the housing-shaped main body 32 of the cartridge 31, a rotating member 41 is rotatably supported in the lateral direction by shaft pins 42a, 42b protruded from the front and back surfaces thereof along the front to back direction of the opening portion 34. Further, a plurality of brushes 43 are implanted on this rotating member 41 in the front to back direction in which direction the cartridge 31 is inserted into the disc drive apparatus 11, thus constructing the cleaning member 30. The rotating member 41 is rotated by an interlocking mechanism 44 which is operated in unison with the opening and closing operation of the aforementioned shutter 36. Then, under the condition that the opening portion 34 is opened by the shutter 36, the brushes 43 are protruded from the outer surface side of the bottom portion 32a of the housing-shaped main body 32.

The interlocking mechanism 44 which rotates the rotating member 41 in unison with the opening and closing operation of the shutter 36 is comprised of a slide lever 45 slidably laterally supported by and engaged with the bottom portion 32a of the housing-shaped main body 32 along the rear portion of the opening portion 34 and a rotating lever 46 pivoted to the bottom portion 32 at the position near the front end portion and whose front end portion 46a is opposed to the inner surface side of the slider 37 to which the shutter 36 is secured and whose rear end portion 46b is engaged with one end side of the slide lever 45. The engagment between the slide lever 45 and the rotating lever 46 is effected by inserting a pin 47 protruded on one end portion of the slide lever 45 downwardly in the vertical direction into a rectangular opening 48 formed through the rear end portion 46b of the rotating lever 46 in the direction crossing the sliding direction of the slide lever 45. Further, an engaging pin 49 is protruded on the surface of the slide lever 45 corresponding to the rear edge side of the opening portion 34, that is, the position (displaced position) distant from the pivoting center of the rotating member 41.

In the thus arranged interlocking mechanism 44, the slide lever 45 is spring-biased by a tension spring 50 in one direction so that the front end portion 46a of the rotating lever 46 is always in contact with the inner surface side of the slider 37.

On the inner surface side of the slider 37 to which the front end portion 46a of the rotating lever 46 of this interlocking mechanism 44 is opposed, a plane cam 37a is formed which opposes the front end portion 46a of the rotating lever 46 under the condition that the shutter 36 closes the opening portion 34 of the housing-shaped main body 32. This plane cam 37a is matched at a predetermined timing of the opening and closing operation of the shutter 36. The slider 37 is spring-biased by a torsion spring 51 such that the shutter 36 always closes the opening portion 34.

A lower side guide edge 52 for the slider 37 is formed on the inside of the front edge portion of the bottom portion 32a of the housing-shaped main body 32, and side edge members 53a and 53b of heights substantially the same as those of the side walls 32b and 32c are vertically formed on the insides of the two side edges of the opening portion 34, thereby forming an accommodating portion 54 in which the cleaning member 30 formed of the rotating member 41 and the brushes 43 are accommodated.

On the other hand, in the lid plate 33 which covers the upper surface side of the housing-shaped main body 32, the front edge portion thereof is bent downwardly, that is, bent toward the housing-shaped main body 32 in an opposing relation to the guide edge 52, thereby being formed as an upper side guide edge 55 for the slider 37. Further, on one side edge of the opening portion 35, a contact edge member 56 is integrally formed by a bending process of the lid plate 33, with which the top of the brush 43 is brought in contact when the top of the brush 43 is overlapped on the inside of an opposing side edge member 53a under the condition that one side edge member of the opening portion 34 of the housing main body 32, that is, the cleaning member 30 is accommodated within the accommodating portion 54. On the other side edge of the opening portion 35, a stopper edge member 57, which restricts the rotational range (substantially 90 degrees) of the rotating member 41, is formed by bending the lid plate 33 under the condition such that this stopper edge member 57 is protruded slightly toward the inside of the opening portion 35.

The opening portion 35 of the lid plate 33 is not always needed and is formed as a punched aperture used to erect the aforementioned contact edge member 56 and the stopper edge member 57. Dusts and smudges on the brushes 43 can be brushed off to the outside by utilizing this opening portion 35.

A cleaning operation of the thus arranged cleaning cartridge will be described.

Figure 10:
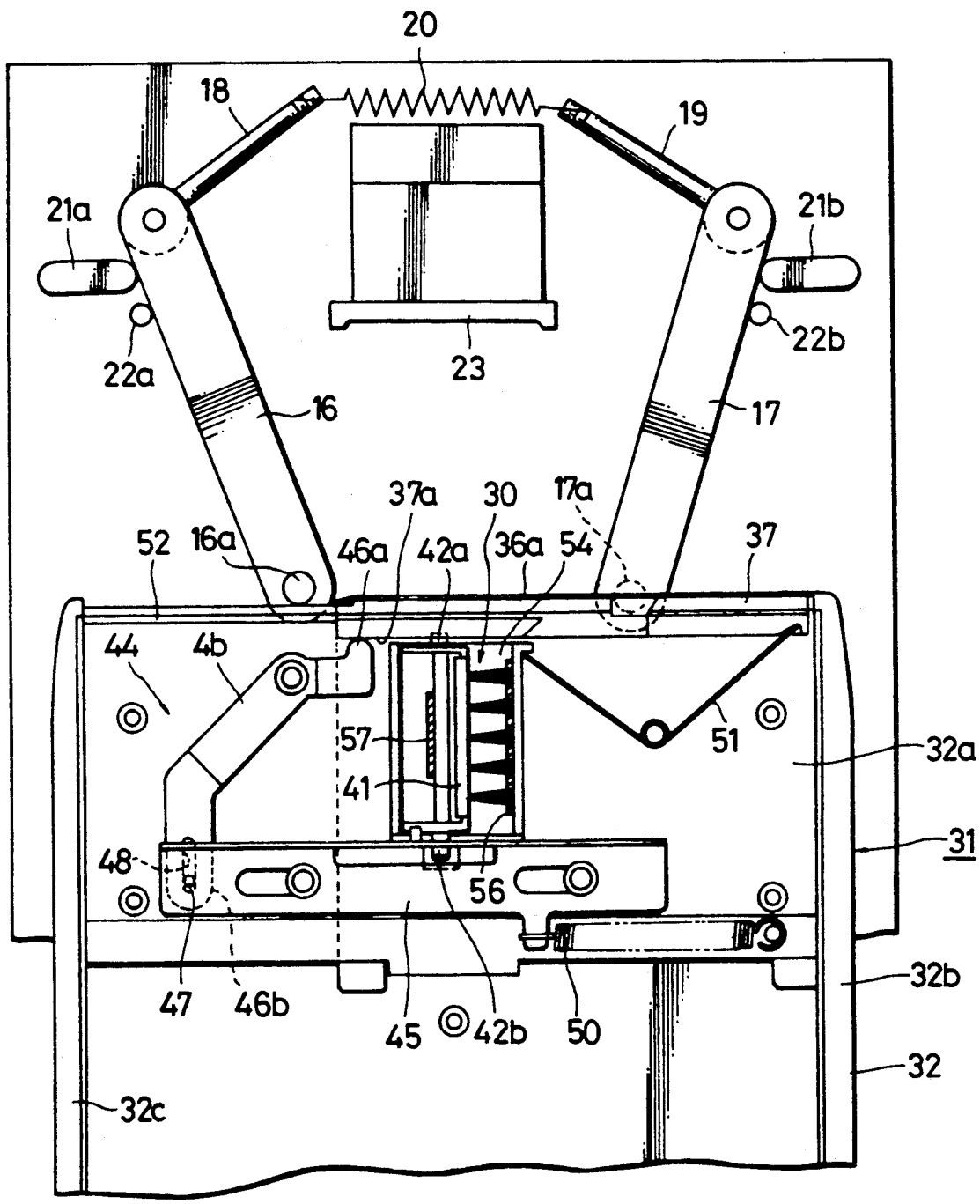
FIGS. 10 and 11 are respectively partly cutaway plan views used to explain the insertion operation of the cleaning cartridge.
Figure 11:
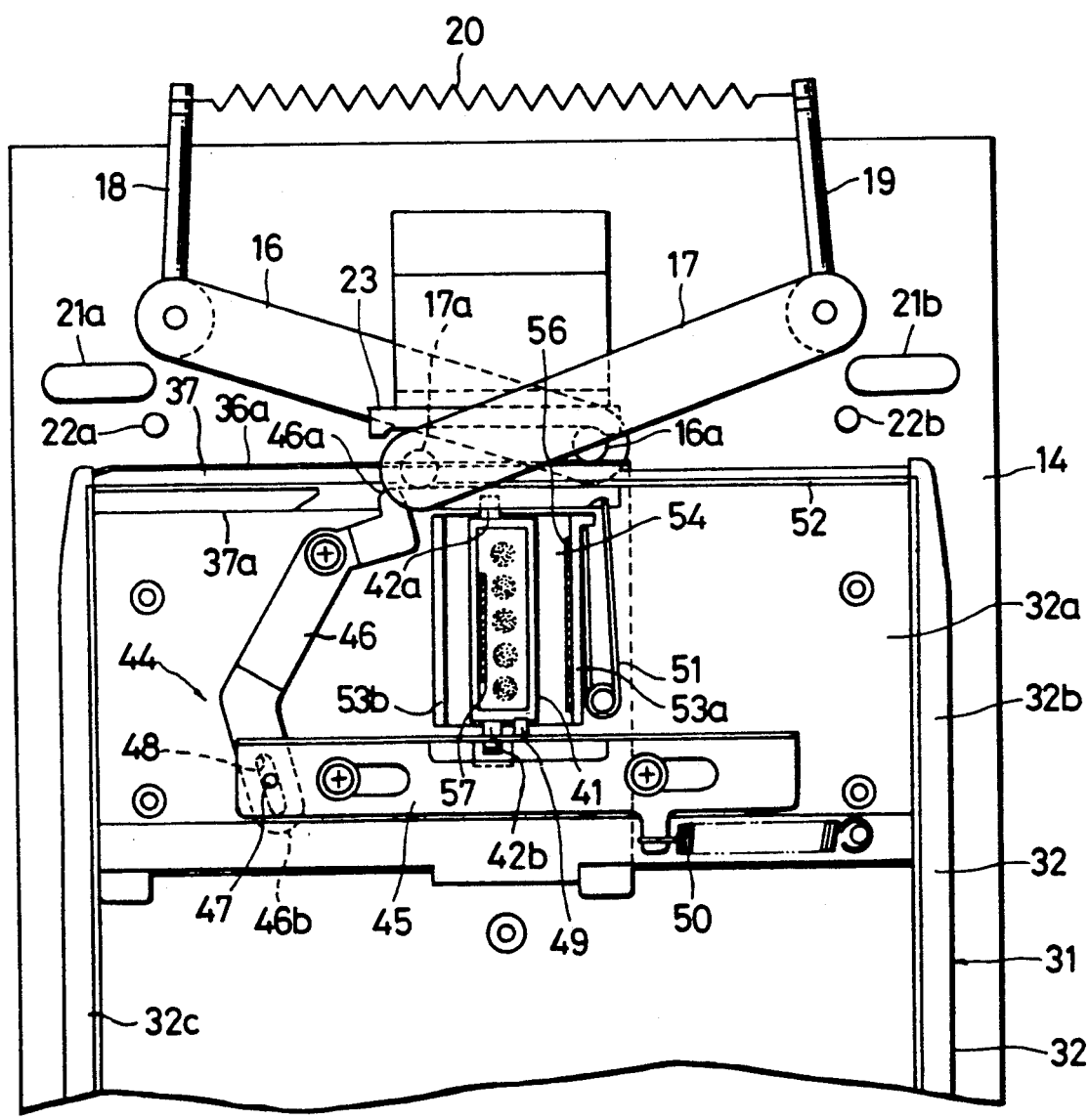
Figure 12:
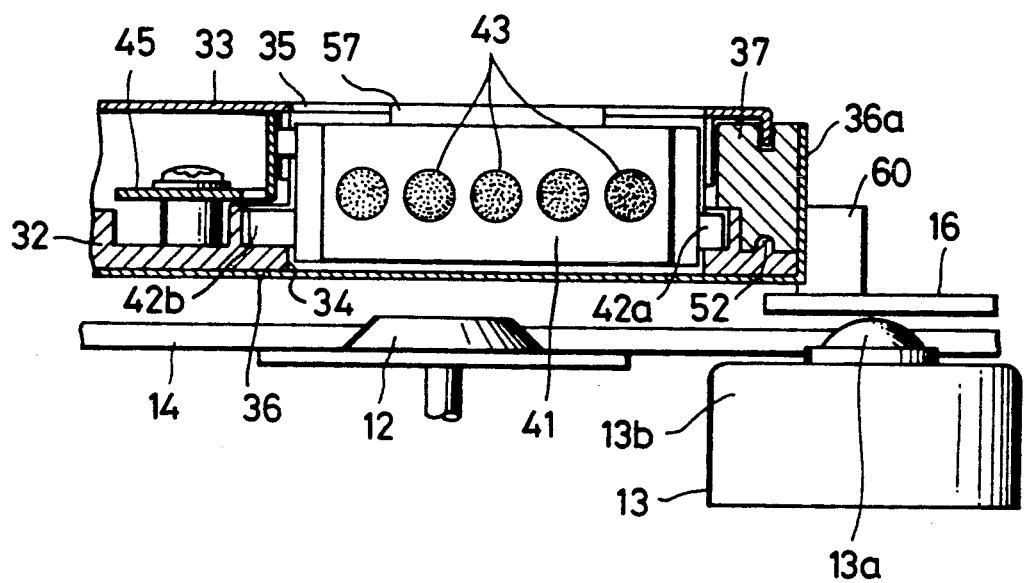
FIG. 12 is a longitudinal cross-sectional view of a main portion of FIG. 10.
Figure 13:
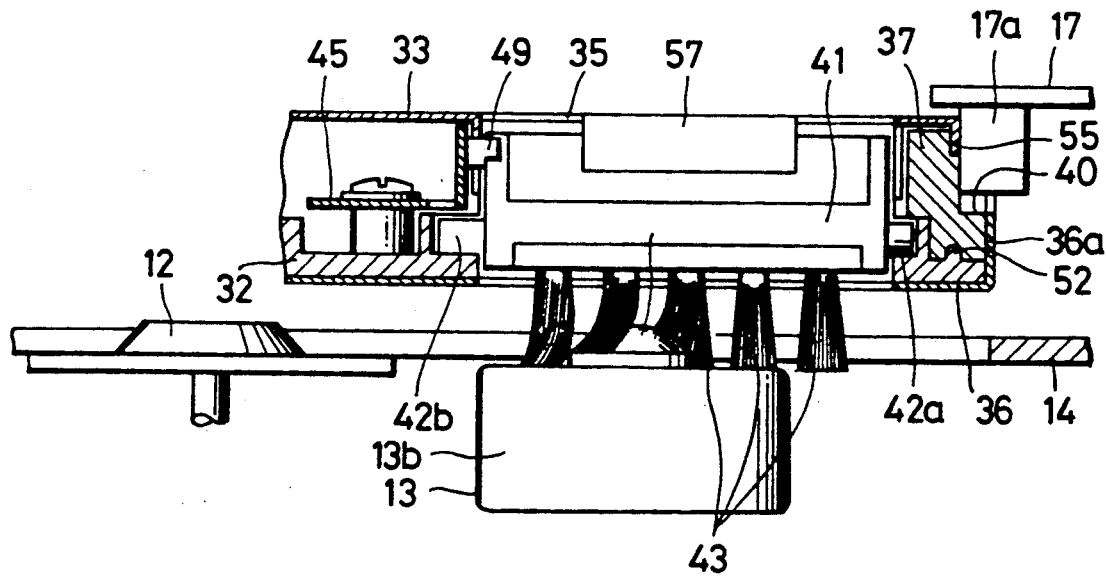
FIG. 13 is a longitudinal cross-sectional view of a main portion of FIG. 11.

As illustrated, when the cleaning cartridge, that is, the cartridge 31 is inserted into the disc drive apparatus 11 from the front wall side with the housing-shaped main body 32 facing downwardly similarly to the disc cartridge 1, the shutter opening and closing pin 17a of the second shutter opening and closing arm 17 is engaged with the engaging concave portion 40 formed through the shutter 36 and the slider 37, whereas the shutter opening and closing pin 16a of the first shutter opening and closing arm 16 merely comes in contact with the front end edge of the housing-shaped main body (see FIG. 10).

If the cartridge 31 is further pushed into the disc drive apparatus 11 from this state, then the two shutter opening and closing arms 16 and 17 are rotated in the backward by such pushing force against the spring-force of the tension spring 20. At that time, the shutter opening and closing pin 17a acts to move the shutter 36 from the closed position to the opening direction in unison with the rotation of the second shutter opening and closing arm 17, whereas the shutter opening and closing pin 16a of the first shutter opening and closing arm 16 is slid along the front wall side 36a of the shutter 36 from the front end edge of the housing-shaped main body 32 without contributing to the opening operation of the shutter 36.

As described above when the cartridge 31 is inserted into the disc drive apparatus 11, in the opening operation of the shutter 36, the slider 37 is slid together under the condition that the cam surface 37a is in slidable contact with the front end portion 46a of the rotating lever 46 of the interlocking mechanism 44. In this state, the rotating lever 46 is not rotated so that the interlocking mechanism 44 is made inoperative.

In this state, the movement of the shutter 36 in the opening direction is maintained, and when the opening portion 34 of the housing-shaped main body 32 is passed over the turntable 12, the cam surface 37a of the slider 37 is detached from the front end portion 46a of the rotating lever 46, whereby the rotating lever 46 is made freely rotatable. Thus, the slide lever 45 is slid by the spring-biasing force of the tension spring 50. By the sliding operation of the slide lever 45, the rotating member 41 of the cleaning member 30 is rotated by means of the engaging pin 49 and the brushes 43 implanted on the rotating member 41 are protruded through the opening portion 34 of the housing-shaped main body 32 to the outside, that is, the outside surface side of the bottom portion 32a, thus the tops of the brushes 43 are slid along the objective lens 13a of the optical pickup device 13. Therefore, dust, smudges and so on on the surface of the objective lens 13a are removed, that is, the cleaning of the objective lens 13a is performed.

As described above, under the condition that the cartridge 31 is inserted into the innermost portion of the disc drive apparatus 11 while cleaning the objective lens 13a, the first shutter opening and closing pin 16a of the first shutter opening and closing arm 16 abuts against the stopper 23 before the cartridge 31 comes in contact with the insertion restricting protrusions 22a and 22b, that is, the first shutter opening and closing pin 16a is sandwiched between the front surface portion of the cartridge 31 and the stopper 23 because the front wall portion of the cartridge 31, that is, the front end edge of the housing-shaped main body 32 has no escape portion such as the concave portion or the like into which the shutter opening and closing pin 16a of the first shutter opening and closing arm 16 can enter. This condition is the same as the condition that the disc cartridge 1 is erroneously inserted into the disc drive apparatus 11 (see FIG. 6). Therefore, the cartridge 31 cannot be fully inserted into the predetermined loading position (see FIG. 11).

Accordingly, the cartridge 31 cannot be locked at the predetermined loading position so that, when the cartridge 31 is released from being pushed by the user's hands, the cartridge 31 is pushed in the ejecting direction by the rotational spring biasing force of the tension spring 20 which rotates the two shutter opening and closing arms 16 and 17. In this initial stage of ejection, the opening portion 34 of the housing-shaped main body 32 is opened and the brushes 43 are protruded with the result that the tops of the brushes 43 are again brought in slidable contact with the objective lens 13a, thereby the cleaning of the objective lens 13a is performed.

Thereafter, the shutter 36 is slid in the closing direction, and under the condition that the opening portion 34 of the housing-shaped main body 32 is passed over the optical pickup device 13, by the sliding operation of the slider 37, the cam surface 37a comes in contact with the front end portion 46a of the rotating lever 46 and pushes the same, whereby the rotating lever 46 is rotated to cause the slide lever 45 to be slid against the spring-biasing force of the tension spring 50.

By the sliding operation of the slide lever 45, the rotating member 41 of the cleaning member 30 is rotated in the reverse direction by means of the engaging pin 49, that is, the rotating member 41 is rotated so that the brushes 43 are fully entered into the housing-shaped main body 32, thus the brushes 43 are accommodated within the accommodating portion 54. Under this condition, the shutter 36 is passed over the turntable 12 while being slid in the closing direction, thus the cartridge 31 being ejected.

The above-mentioned insertion and eject operations of the cartridge 31 are performed several times, whereby the cleaning of the objective lens 13a of the optical pickup device 13 is carried out substantially completely.

As described above, when the cleaning cartridge 31 of this embodiment is inserted into and ejected from the disc drive apparatus 11, the brushes 43 of the cleaning member 30 are protruded only at the position corresponding to the optical pickup device 13 to come in slidable contact with the objective lens 13a. There is then no risk that the objective lens 13a is smudged by smudges on the brushes obtained from other portions such as the cartridge insertion opening, the turntable, the turntable shaft or the like. Therefore, the objective lens 13a can be cleaned positively, and when the cleaning cartridge 31 is not in use, the cleaning member 30 can be automatically protected by the shutter 36.

Figure 14:
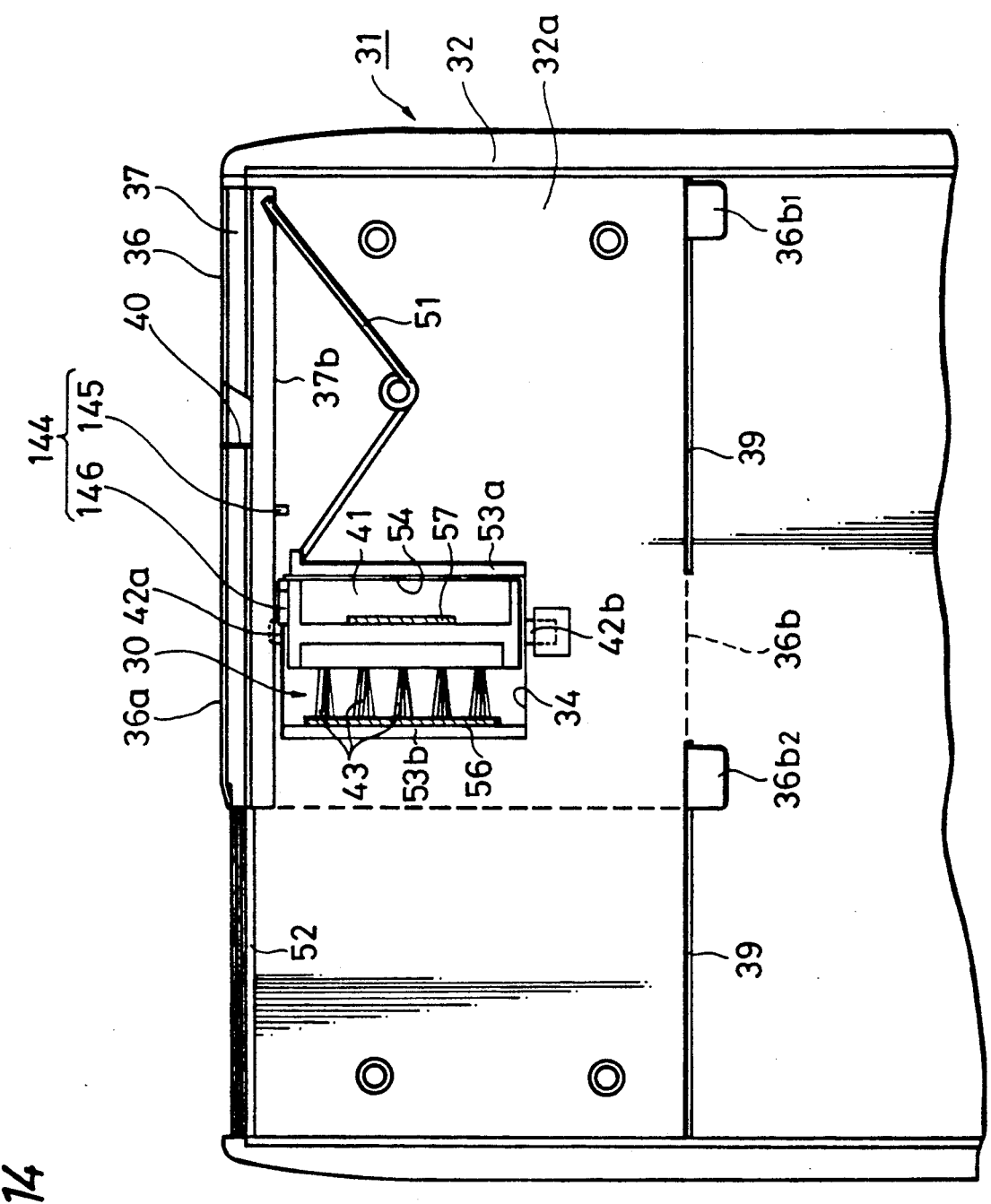
FIG. 14 is a partly-omitted plan view of a second embodiment of the cleaning cartridge according to the present invention.
Figure 15:
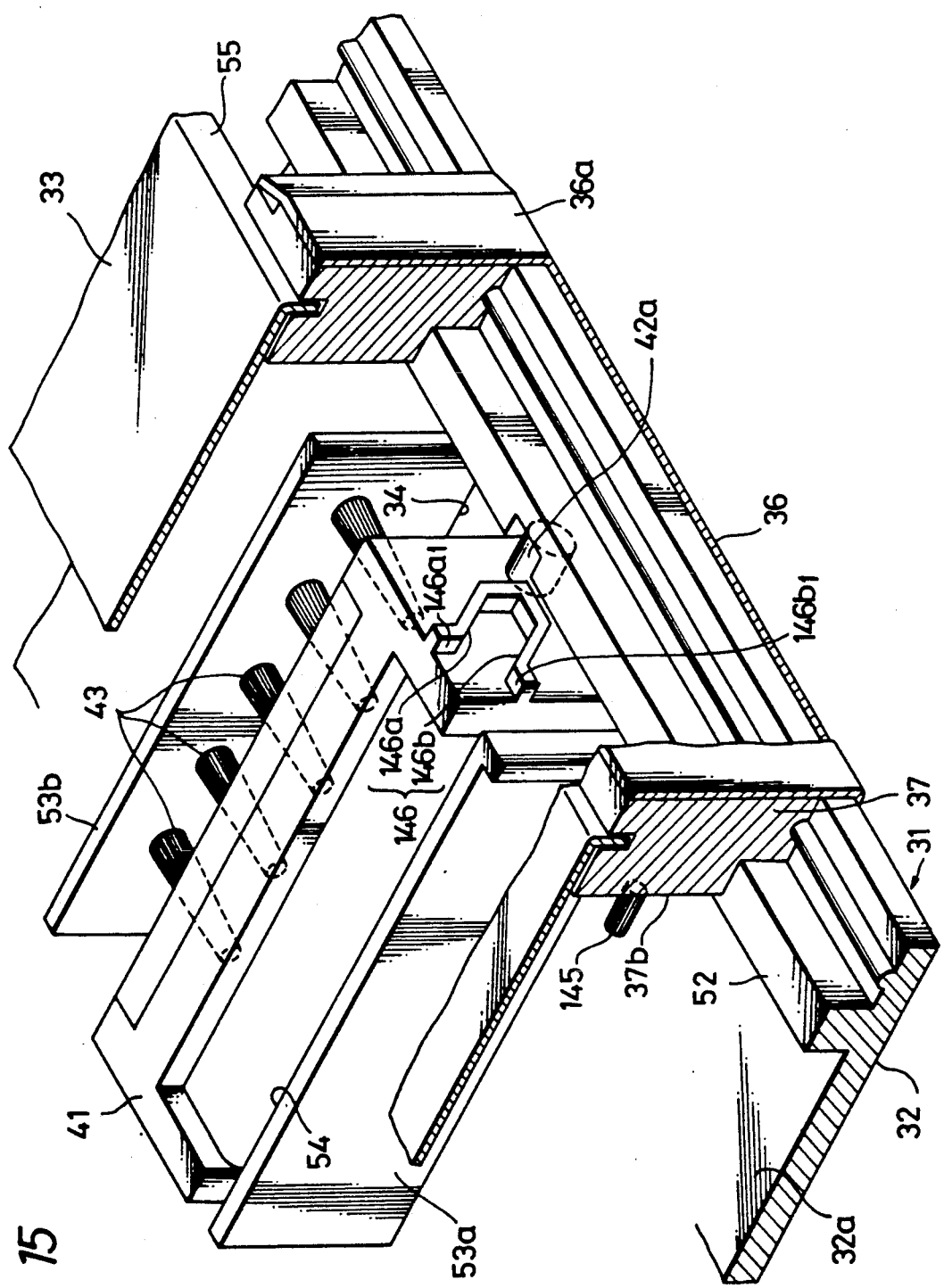
FIG. 15 is a perspective view of a main portion of the second embodiment of the cleaning cartridge according to the present invention.

A second embodiment of the present invention will be described with reference to FIGS. 14 to 16. Throughout FIGS. 14 to 16, like parts corresponding to those of the preceding embodiment are marked with the same references and therefore need not be described in detail.

Also in this embodiment, the cartridge 31 of substantially the same size as that of the disc cartridge 1 is composed of the housing-shaped main body 32 and the lid plate 33 made of the conductive metal and which covers the upper surface side of the housing-shaped main body 32. The shutter 36 which opens and/or closes the opening portion 34 formed through the bottom portion 32a of the housing-shaped main body 32 is secured at its bent front wall portion 36a to the slider 37 slidably engaged between the housing-shaped main body 32 and the front edge of the lid plate 33 in the lateral direction, and protrusions 36b1 and 36b2 protruded on the rear edge 36b are engaged into guide slots 39 of slit-shaped configurations formed through the bottom portion 32a of the housing-shaped main body 32 in the lateral direction whereby the shutter 36 can be freely slid in the lateral direction.

The engaging recess 40 for opening and closing operations is also formed on the front wall side of this shutter 36 in a range from the bent front wall portion 36a to the slider 37.

The housing-shaped main body 32 of the cartridge 31 houses the cleaning member 30 in an opposing relation to the opening portion 34. This cleaning member 30 includes the rotating member 41 which has a length substantially covering the front to back of the opening portion 34, and shaft pins 42a and 42b which are protruded on the front and rear end faces thereof and supported by the front and rear edge portions of the opening portion 34 to be rotatable in the lateral direction. Further, a plurality of brushes 43 are implanted on the rotating member 41 in the front to back direction in which direction the cartridge 31 is inserted into the disc drive apparatus 11. In this cleaning member 30, the rotating member 41 is rotated in unison with the opening and closing operation of the shutter 36, and under the condition that the opening portion 34 is opened by the shutter 36, this rotating member 41 is rotated so that the brushes 43 are protruded from the outside surface side of the bottom portion 32a of the housing-shaped main body 32.

In the second embodiment, an interlocking member for the cleaning member 30 and the shutter 36 is different from the interlocking mechanism 44 of the first embodiment.

The interlocking mechanism 144 of this embodiment is comprised of an engaging pin 145 protruded from the slider 37 at its inside wall 37b to which the shutter 36 is secured as a pushing member and an engaging protruded face 146 protruded from the front end wall 41a of the rotating member 41 of the cleaning member 30 opposing to the inside wall 37b of the slider 37 as a pushed member and which is brought in contact with the engaging pin 145 in the sliding operation of the slider 37.

Figure 16:
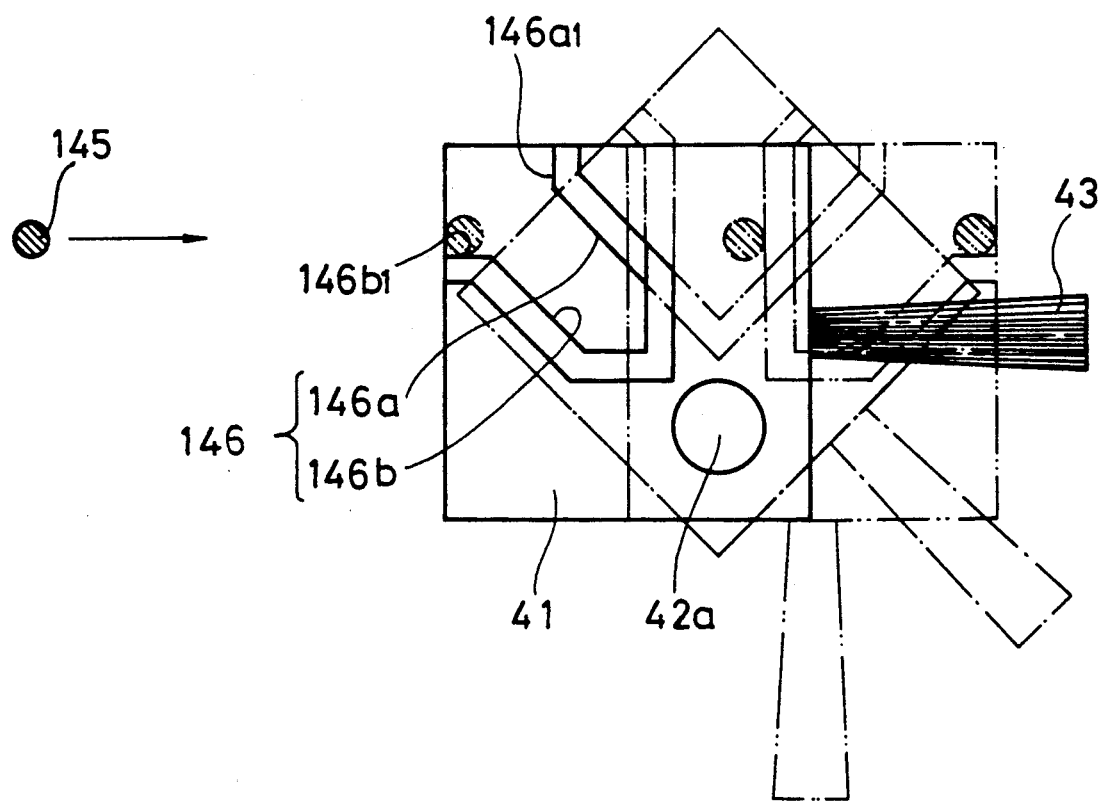
FIG. 16 is a schematic diagram used to explain an operation of the second embodiment of the cleaning cartridge according to the present invention.
Figure 21:
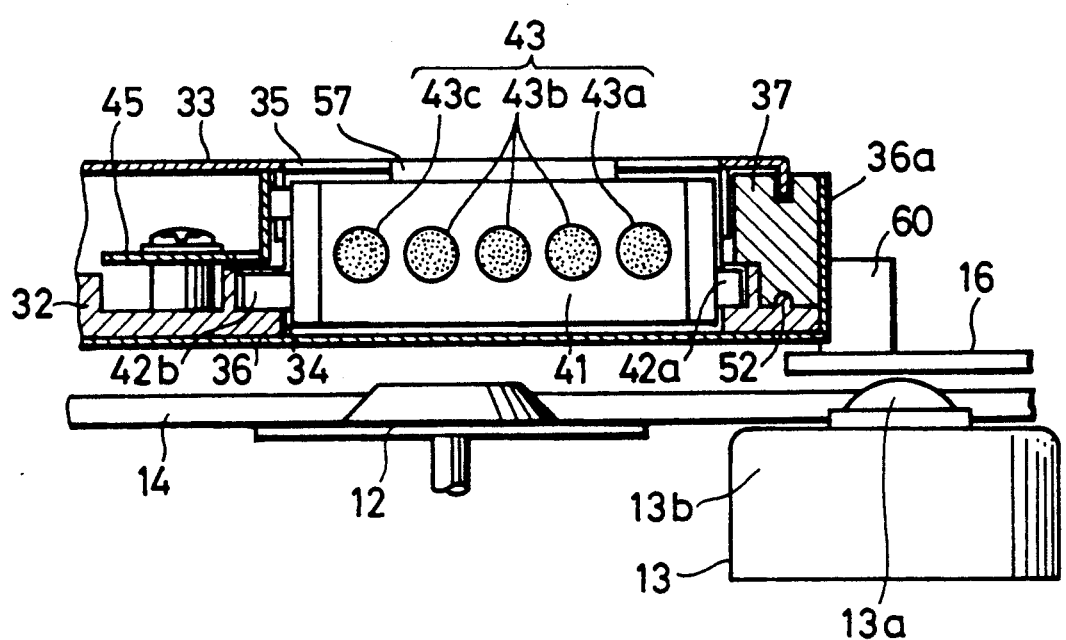
FIGS. 21 and 22 are respectively longitudinal cross-sectional views of the main portion of the fourth embodiment and to which references will be made in explaining the operation of the third embodiment of the present invention.

More specifically, as shown in FIG. 16, the engaging protruded face 146 is comprised of a first engaging protruded surface 146a pushed by the engaging pin 145 in the sliding operation of the slider 37 when the shutter 36 is opened and a second engaging protruded surface 146b by the engaging pin 145 in the returning slide operation of the slider 37 when the shutter 36 is closed.

In the thus arranged interlocking mechanism 144 of the cleaning member 30 and the shutter 36, when the slider 37 is slid in the direction in which the shutter 36 opens the opening portion 34 of the housing-shaped main body 32, the engaging pin 145 comes in contact with the first engaging protruded surface 146a of the rotating member 41. If the slider 37 is further slid in the opening direction, the first engaging protruded surface 146a is pushed by the engaging pin 145 so that the rotating member 41 is rotated about the shaft pins 42a and 42b. Then, under the condition that the opening portion 34 is opened substantially completely, the brushes 43 implanted on the rotating member 41 are protruded to the outside surface side of the bottom portion 32a of the housing-shaped main body 32 through the opening portion 34.

Further, under the condition that the brushes 43 of the cleaning member 30 are protruded from the opening portion 34 of the housing-shaped main body 32, the second engaging protruded surface 146b of the rotating member 41 is opposed to the engaging pin 145 of the slider 37. If under this condition the slider 37 is slid in the direction in which the shutter 36 closes the opening portion 34, then the engaging pin 145 comes in contact with the second engaging protruded surface 146b of the rotating member 41 and pushes the second engaging protruded surface 146b to thereby rotate the rotating member 41 in the direction opposite to the aforenoted direction. Thus, the brushes 43 are entered into the housing-shaped main body 32 from the opening portion 34 and the shutter 36 closes the opening portion 34.

In order to ensure that the brushes 43 of the cleaning member 30 are reliably protruded from or entered into the opening portion 34 of the housing-shaped main body 32 in the above-mentioned operation, the end portion side of the first engaging protruded surface 146a of the rotating member 41 is formed as a pushing face 146a1 which is substantially parallel to the surface of the rotating member 41 on which surface the brushes 43 are implanted, and the end portion side of the second engaging protruded surface 146b is formed as a pushing surface 146b1 which is substantially perpendicular to the surface of the rotating member 41 on which surface the brushes 43 are implanted, respectively.

The first and second engaging protruded surfaces 146a and 146b are formed as described above so that, when the rotating member 41 is rotated by the engaging pin 145 of the aforementioned slider 37, that is, when the rotating member 41 is rotated so as to protrude the brushes 43 in the opening operation of the shutter 36, in this final stage, the engaging pin 145 is brought in contact with the pushing face 146a1 of the first engaging protruded surface 146a to push the same. Thus, the rotating member 41 is rotated so as to cause the brushes 43 to be placed in substantially complete protruded condition. Further, when the rotating member 41 is rotated so as to cause the brushes 43 to be entered into the opening portion 34 in the closed condition of the shutter 36, in this final stage, the engaging pin 145 comes in contact with the pushing surface 146b1 of the second engaging protruded surface 146b to thereby rotate the rotating member 41 so that the brushes 43 are reliably entered into the housing-shaped main body 32.

According to the thus arranged cleaning cartridge of the second embodiment, similar to the cleaning cartridge of the first embodiment, this cleaning cartridge is inserted into and loaded on the disc drive apparatus to thereby perform the cleaning of the objective lens.

That is, when the cartridge 31 is inserted into the disc drive apparatus 11 from the front wall side with its housing-shaped main body 32 facing downward, then the slider 37 is slid in the opening direction of the shutter 36 to thereby cause the brushes 43 to be protruded from the bottom portion 32a of the housing-shaped main body 32. Accordingly, the tops of the brushes 43 are brought in slidable contact with the objective lens of the optical pickup device to thereby remove dust, smudges and so on on the surface of the objective lens, thus the objective lens is cleaned.

While in this embodiment the mechanism for directly transmitting the sliding operation of the slider 37 to the rotational operation of the rotating member 41 on which the brushes 43 are implanted is formed of the contact pushing mechanism composed of the engaging pin 145 and the engaging protruded surfaces 146a and 146b, this mechanism is not limited thereto and may be formed of other interlocking mechanisms, such as a cam mechanism or the like.

As described above, according to the second embodiment, since the slider 37 to which the shutter 36 for opening and closing the opening portion 34 of the housing-shaped main body 32 is secured is slidably moved to directly rotate the rotating member 41 on which the brushes 43 of the cleaning member 30 are implanted and a supporting mechanism utilizing a spring force is omitted, the operation can be stabilized more and the quality of the cleaning cartridge can be improved. Also, the number of parts is decreased so that the assembly process is reduced and hence the cleaning cartridge can be made at low cost.

The contact member 56 formed on the lid plate 33 side and which is inserted into the accommodating portion 54 of the cleaning member 30 formed on the housing main body 32 of the cartridge 31 to contact with the tops of the brushes 43 is formed as a wave shape or the like, whereby dust on the brushes 43 is brushed off by the contact of the contact member 56 with the brushes 43, thus the brushes 43 themselves are cleaned.

Further, shapes and constructions of the respective members can be properly modified such as when the opening portion 35 of the lid plate 33 is omitted so long as the operation similar to the above-mentioned operation can be effected.

As described above, according to the above embodiments of the cleaning cartridge of the present invention, dusts on the objective lens of the optical pickup device within the disc drive apparatus can be easily removed without requiring the electrical driving force at all. Particularly, since the cleaning member is made retractable within the cartridge in unison with the loading operation of the disc cartridge, the cleaning member is slid only along the objective lens without contacting with other portions before being slid along the objective lens, thereby substantially perfectly avoiding the disadvantage that dust on other portions of the disc drive apparatus are caused to adhere to the objective lens. Therefore, the objective lens can be cleaned reliably.

Furthermore, when not in use, the cleaning member is retracted into the cartridge and protected therein so that the cleaning member can be prevented from being deformed and smudged undesirably. Therefore, the cleaning member can be repeatedly utilized during a long period of time.

In the aforementioned embodiments of the cleaning cartridge, however, the brush provided as the cleaning member can clean only the objective lens but such cleaning member cannot clean the disc drive mechanism, such as the turntable, the turntable shaft and so on.

The turntable of the disc drive mechanism is easily smudged by dust or the like and also when a disc hub is chucked to the turntable shaft in the loading operation of the disc cartridge onto the disc drive mechanism, both the disc hub and the turntable shaft are rubbed with each other and the turntable shaft itself is worn so that metal powder therefrom smudges the turntable, the top of the turntable shaft or the like. There is then the risk that mis-chucking will occur.

Figure 17:
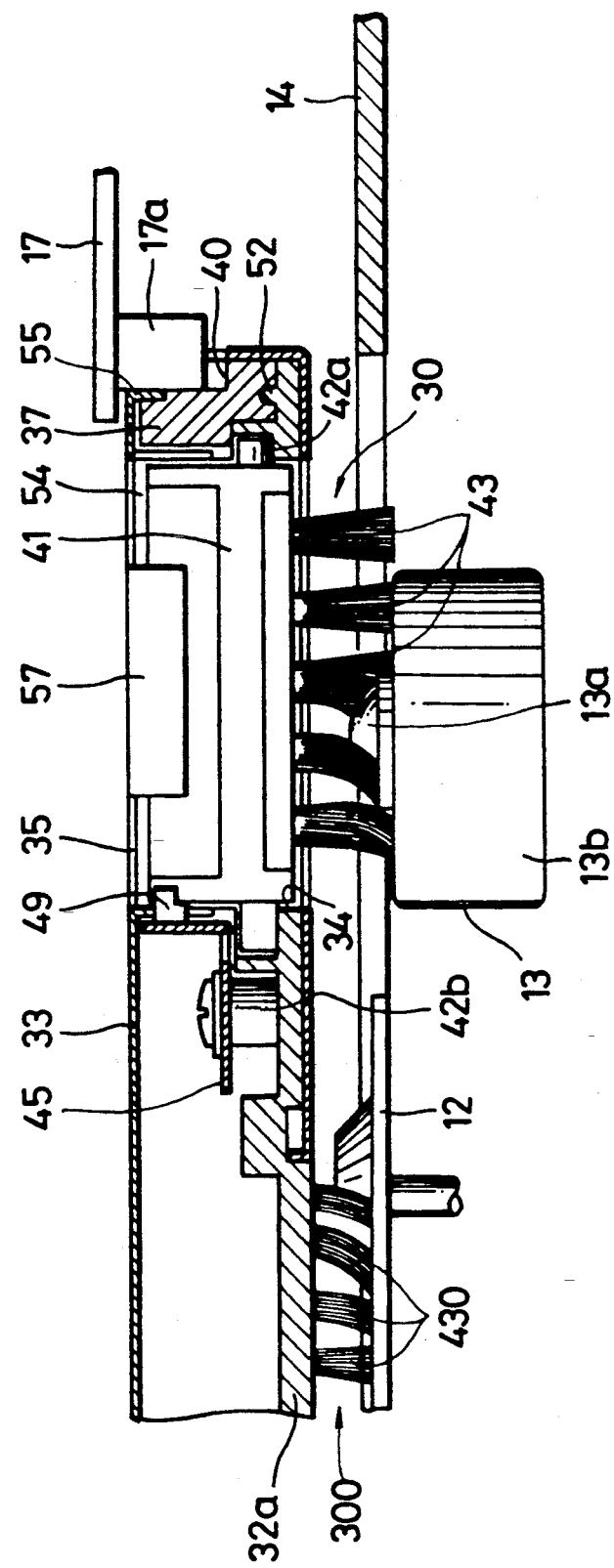
FIG. 17 is a longitudinal cross-sectional view of a main portion of a third embodiment of the cleaning cartridge according to the present invention.
Figure 18:
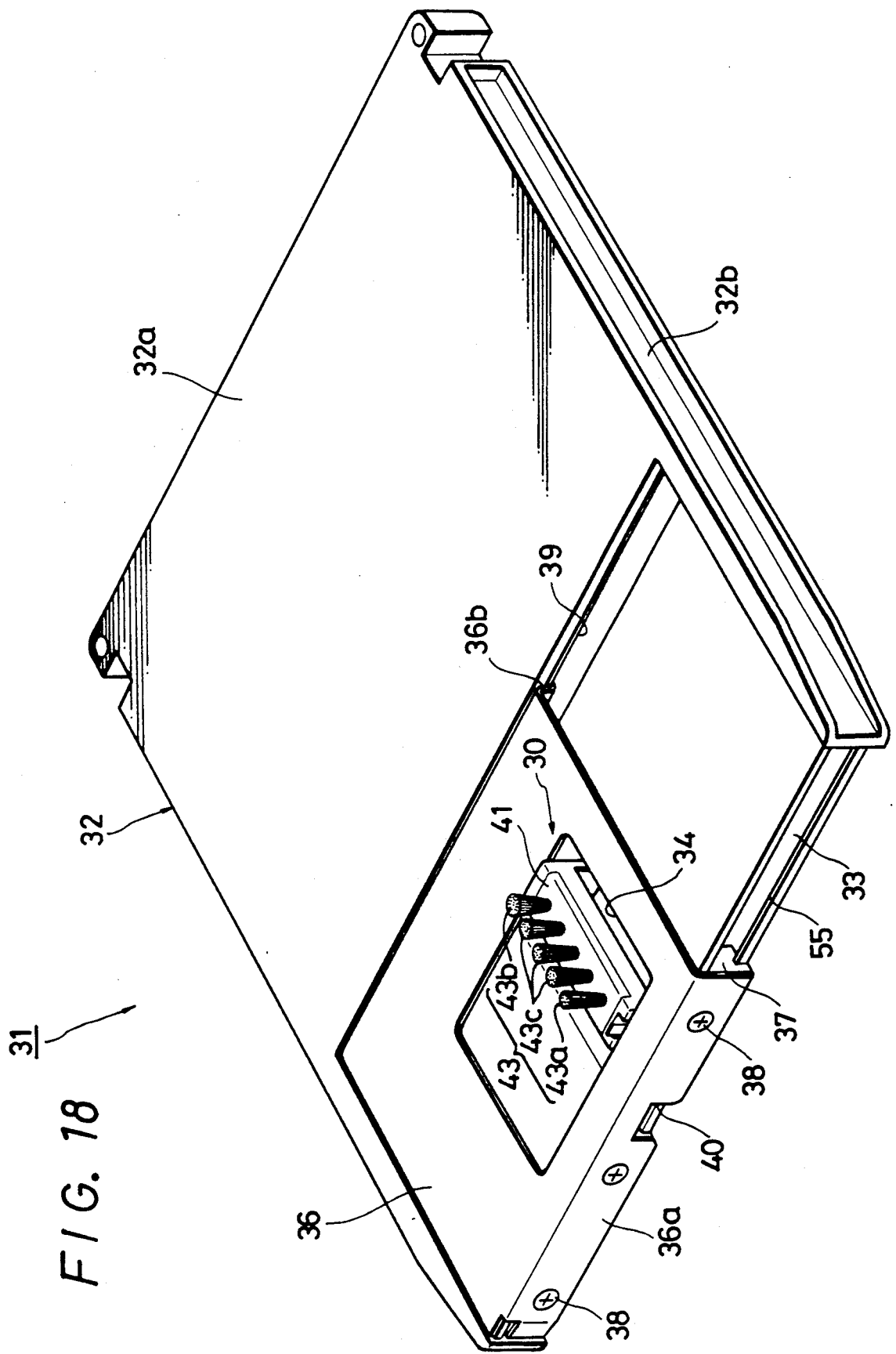
FIG. 18 is a perspective view of the third embodiment of the cleaning cartridge according to the present invention and illustrating from the lower surface side thereof the condition that a cleaning member is protruded.
Figure 19:
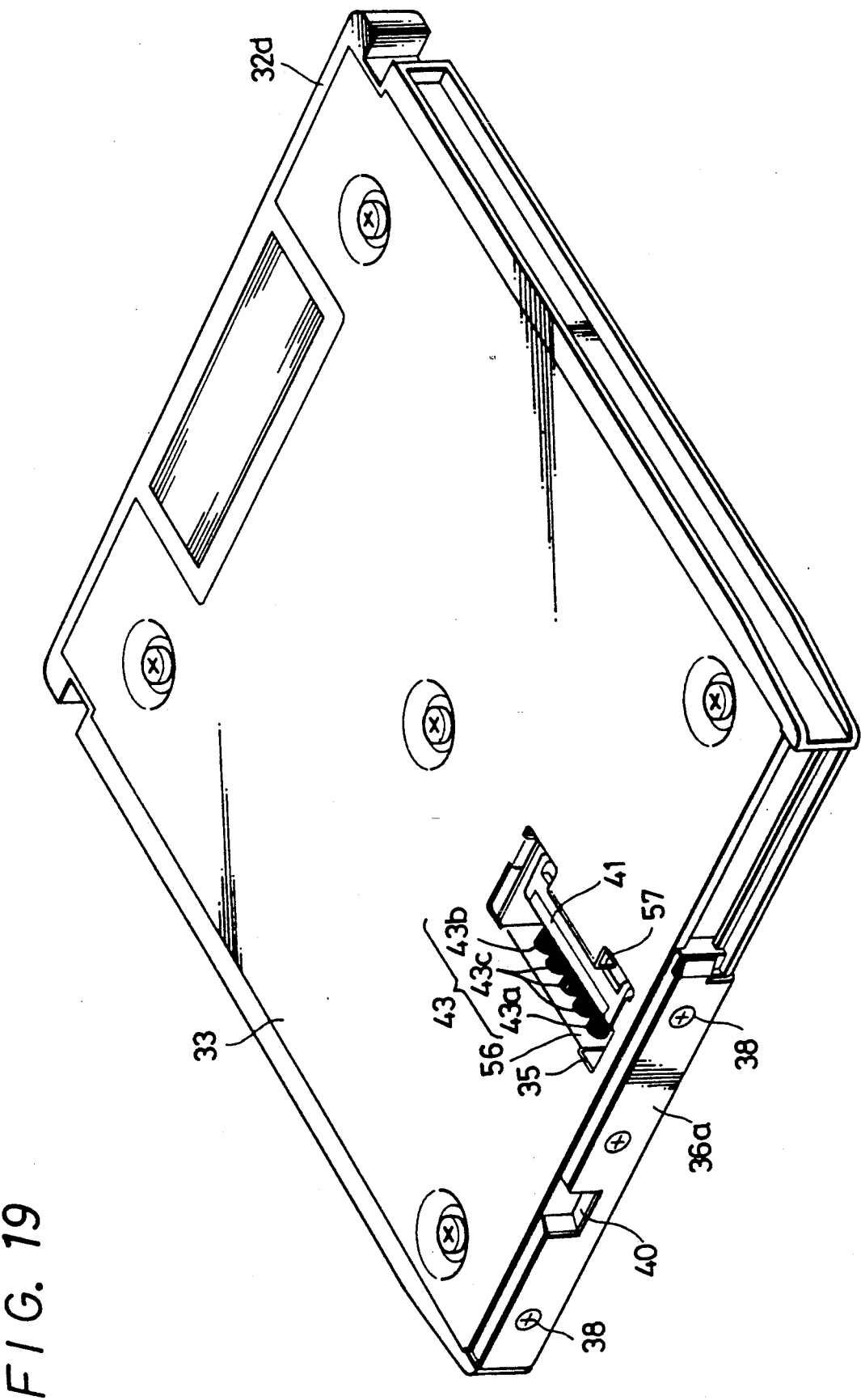
FIG. 19 is a perspective view of the fourth embodiment of the cleaning cartridge according to the present invention and illustrating from the upper surface side thereof the condition that the cleaning member is retracted into the cartridge body.
Figure 20:
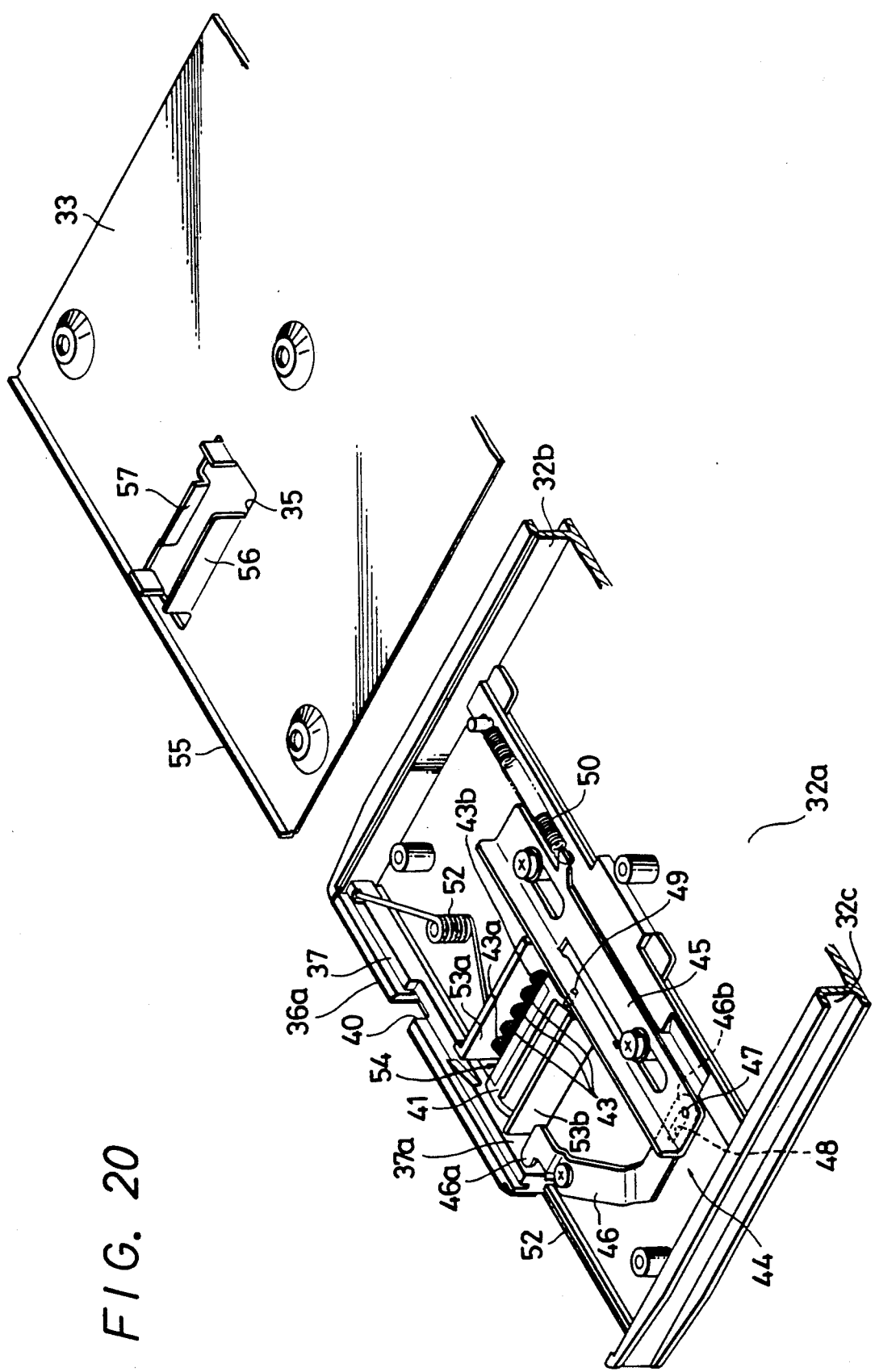
FIG. 20 is a fragmentary, exploded view of a main portion of the cleaning cartridge of the fourth embodiment according to the present invention.
Figure 22:
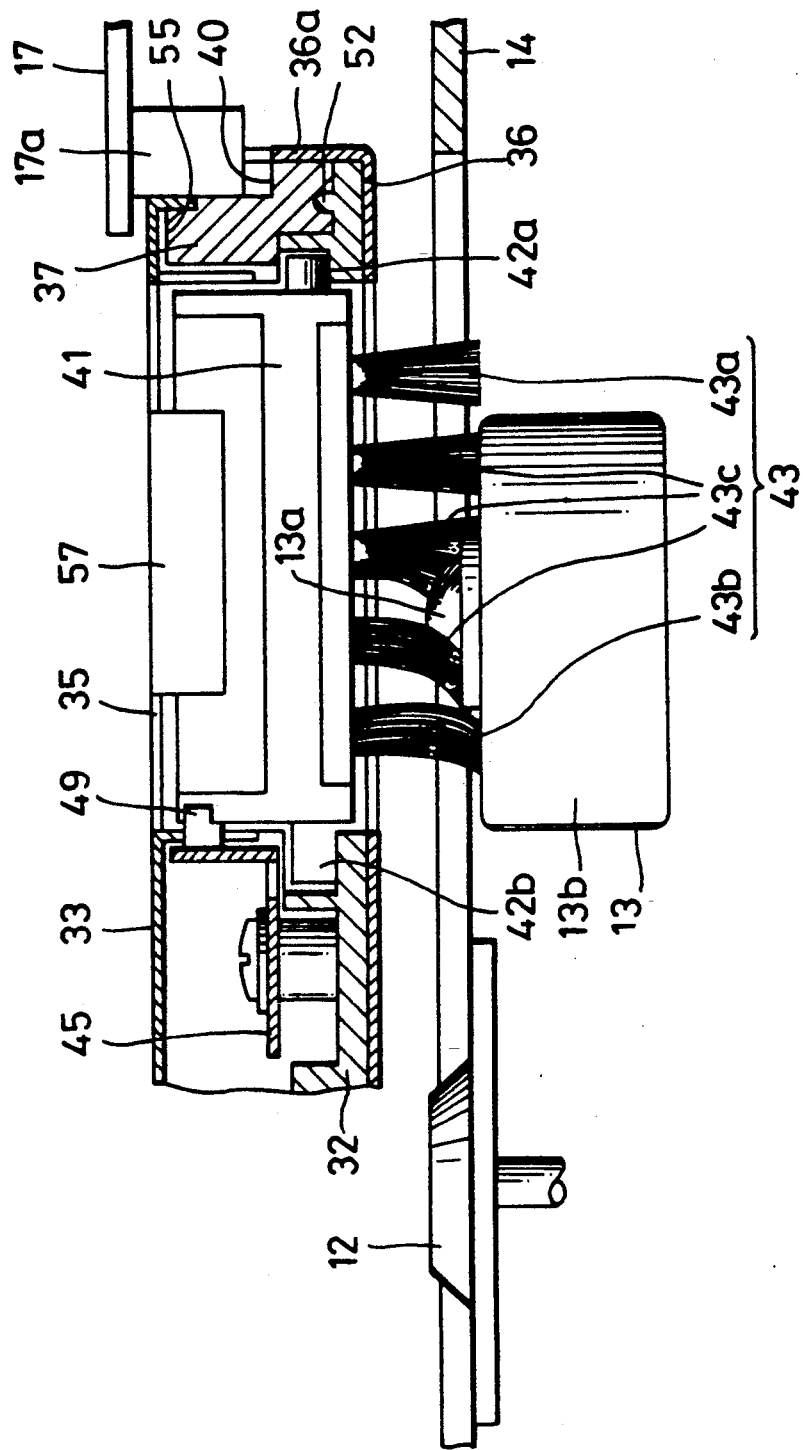

FIG. 17 shows a main portion of a third embodiment of the present invention which can remove the above-described shortcomings and disadvantages. In FIG. 17, like parts corresponding to those of the preceding embodiments are marked with the same references and therefore need not be described in detail.

As shown in FIG. 17, the cartridge 31 which is substantially the same as the disc cartridge 1 in size and in outer appearance is provided with the lens cleaning member 30 and a disc drive mechanism cleaning member 300, thereby a cleaning cartridge being constructed.

Further, as shown in FIG. 17, brushes 430 of the same diameter and of substantially the same width of the diameter of the turntable 12 are implanted on the lower surface at the central portion, of the cartridge 31, that is, the outer surface side central portion of the bottom portion 32a of the housing main body 32, and a disc drive mechanism cleaning member 300 is thereby formed. These brushes 430 are formed by hard brush bundles so as to establish the positional relationship such that, when the brushes 43 are located over the optical pickup device 13, the brushes 430 are placed over the turntable 12.

Accordingly, the brushes 430 for the disc drive mechanism cleaning member 300 and which are implanted on the outer surface side central portion of the bottom portion 32a of the housing main body 32 are slid along the top surface of the turntable 12.

Thus, dust and smudges or the like on the surface of the objective lens 13a and the turntable 12 are removed, that is, the objective lens 13a, the turntable 12 and the turntable shaft are cleaned.

The brushes 430 of the disc drive mechanism cleaning member 300 are formed above the turntable 12 so as to be shorter than the protruded length of the brushes 43 of the lens cleaning member 30 in view of the height and positional relationship relative to the optical pickup device 13.

As described above, according to the third embodiment of the present invention, dusts and smudges on the objective lens of the optical pickup device and the disc drive mechanism such as the turntable or the like within the disc drive apparatus can be easily removed. Particularly, since the objective lens and the disc drive mechanism are cleaned at the same time, this cleaning can save time and a lot of trouble, and also dust of one member can be prevented from being moved to smudge the other member. That is, the members of the two sides can be cleaned reliably, thereby maintaining the optical disc drive apparatus in such an excellent condition that the optical disc, the magneto optical disc or the like can be always recorded and/or reproduced positively.

Incidentally, most of the objective lens of the optical pickup device within the disc drive apparatus is molded from a resin, and the brush made of resin or cloth is used as the cleaning member of the above-mentioned embodiments of the cleaning cartridge of the present invention or the like. Thus, when the cleaning member molded from resin is slid along the objective lens made of the resin, dusts and smudges on the objective lens are removed whereas static electricity is charged on the cleaning member and the objective lens by friction caused by the sliding operation therebetween.

As a consequence, an objective lens driving electric circuit and so on are troubled by static electricity charged on the objective lens, which causes a malfunction. Further, since the cleaning member is charged by static electricity, dust adheres to the cleaning member itself and this dust is caused to adhere to the objective lens in the next cleaning operation. On the contrary, there is then the risk that the objective lens will be smudged.

A fourth embodiment of the present invention, which can remove the aforenoted shortcomings and disadvantages of other embodiments, will hereinafter be explained with reference to FIGS. 18 to 22. In FIGS. 18 to 22, like parts corresponding to those of the preceding embodiments are marked with the same references and therefore need not be described in detail.

As illustrated, in the brush 43 implanted on the rotating member 41 for forming the cleaning member 30, brush bundles 43a and 43b placed on the front and rear of the row of brush are formed as conductive brushes which undergo the conductive-treatment, whereas a plurality of brush bundles 43c placed in the intermediate portion of the row of brush are formed as ordinary brushes. The contact edge member 56 with which the tops of the brushes 43 contact is formed so as to become a static electricity earth.

A cleaning operation of the fourth embodiment will be explained. In this cleaning operation, the brush 43 of the cleaning member 30 is slid along the objective lens 13a as follows.

When the cartridge 31 is inserted into the disc drive apparatus 11, the conductive brush bundle 43a at the front end portion is initially brought in slidable contact with a conductive lens cover 13b of the optical pickup device 13 and then the objective lens 13a, and then the ordinary brush bundles 43a provided at the intermediate portion are sequentially brought in slidable contact with the objective lens 13a. Finally, the conductive brush bundle 43a provided at the rear end portion is slidably moved along the objective lens 13a to the conductive lens cover 13b.

When the cartridge 31 is ejected from the disc drive apparatus 11, in the order opposite to the aforementioned order, the conductive brush bundle 43b provided at the rear end portion is brought in slidable contact with the conductive lens cover 13b to the objective lens 13a and finally, the conductive brush bundle 43a provided at the front end portion is brought in slidable contact with the objective lens 13a and the lens cover 13b.

Incidentally, under the condition that the cleaning member 30 is accommodated within the cartridge 31, or within the accommodating portion 54 of the housing main body 32, the tops of the respective brushes 43a to 43c of the brush 43 are brought in contact with the contact edge member 56 of the lid plate 33 and maintained in that condition.

Further, when the cartridge 31 is inserted into and/or ejected from the disc drive apparatus 11, or in the cleaning operation, in the brush 43 of the cleaning member 30, the conductive brushes 43a and 43b provided at the front and rear ends are slidably moved across the objective lens 13 a and the conductive lens cover 13b of the optical pickup device 13, so that static electricity generated on the objective lens 13a is conducted to the lens cover 13b. As a result, since the lens cover 13b is electrically connected to the base side of the disc drive apparatus 11, the static electricity is grounded and the electrified condition can be removed.

Furthermore, since the cleaning member 30 is accommodated into the accommodating portion 54 and the top of the brush 43 are brought in contact with the contact edge member 56 of the conductive lid plate 33 when the cartridge 31 is ejected from the disc drive apparatus 11, charges electrified on the ordinary brushes 43c of the brush 43 are escaped to the lid plate 33 side and discharged to the base side of the disc drive apparatus 11, thus the electrified condition being removed. Accordingly, a bad influence exerted upon the objective lens driving circuit and so on by the static electricity charged on the objective lens 13a can be reduced and dust can be prevented from adhering to the objective lens 13a. Furthermore, the brush 43 itself can be protected from being smudged by dust and the objective lens 13a itself can be cleaned reliably.

Incidentally, according to the present invention, in the preceding embodiments wherein the brushes are directly implanted on the lower surface of the cartridge as the cleaning member, if the brush bundles at the front and rear ends are made to have the conductive property, charges on the objective lens can be removed. In that case, charges on the brush itself can be removed by contacting the brush with another conductive metal plate or the like.

As set out above, according to the cleaning method of the present invention, since the charged static electricity of at least one of the objective lens and the cleaning member is removed after the completion of the cleaning operation, dust on the objective lens of the optical pickup device within the disc drive apparatus can be removed easily and positively, and also the objective lens can be protected from being smudged by new dusts. Furthermore, a bad influence exerted upon the objective lens driving electric circuit or the like by the static electricity can be reduced and hence, a malfunction can be avoided.

In addition, the amount of special antistatic material applied to the objective lens, the cleaning member or the like can be reduced and the cost of the cleaning cartridge can be reduced considerably.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. An objective lens cleaning cartridge for an optical disc drive apparatus comprising:
    a cartridge body having a movable shutter;
    a cleaning member freely protruding from and retractable into said cartridge body, said cleaning member being in slidable contact with an objective lens of an optical pickup device provided within said optical disc drive apparatus only in a protruded position; and
    driving means for causing said cleaning member to protrude from said cartridge body in unison with opening of said movable shutter during a loading operation of said cartridge body into said optical disc drive apparatus.

2. An objective lens cleaning cartridge for an optical disc drive apparatus according to claim 1, in which said cleaning member is rotatably provided within a concave portion formed on said cartridge body, said cleaning member being protruded from an opening portion of said cartridge body by said driving means in unison with the opening of said movable shutter and said cleaning member being retracted into said concave portion of said cartridge in unison with the closing of said movable shutter.

3. An objective lens cleaning cartridge for an optical disc drive apparatus according to claim 1, in which said cleaning member is operated by said driving means with the opening of said movable shutter so that said cleaning member protrudes from said cartridge body upon reaching a position opposing said objective lens of said disc drive apparatus.

4. An objective lens cleaning cartridge for an optical disc drive apparatus according to claim 3,
    in which the optical disc drive apparatus includes a disc drive and said driving means drives said cleaning member such that said cleaning member is protruded from said cartridge body at a time after said cleaning member has passed over said disc
    drive during the loading operation of said cartridge onto said disc drive apparatus.

5. An objective lens cleaning cartridge for an optical disc drive apparatus according to claim 1, in which the optical disc drive apparatus includes a disc drive and
    said cartridge further includes a second cleaning member fixedly provided on a main surface of said cartridge body protruding in a direction in which said cleaning member is protruded, said second cleaning member for cleaning a surface of said disc drive.

6. An objective lens cleaning cartridge for an optical disc drive apparatus according to claim 1,
    in which said cartridge body includes a metallic electrical conductor in electrical contact with the optical disc drive apparatus and being arranged so as to come in contact with and remove static electricity from said cleaning member
    when said cleaning member is in its retracted state in said cartridge body.

7. An objective lens cleaning cartridge for an optical disc drive apparatus according to claim 1,
    in which said cleaning member is protruded through an opening portion formed on said shutter when said shutter is opened during the loading operation of said cartridge onto said disc drive apparatus.

8. An objective lens cleaning cartridge for an optical disc drive apparatus according to claim 7,
    further comprising means for rotating said cleaning member in one direction so that said cleaning member is protruded from said cartridge body and for rotating in another direction so that
    said cleaning member is retracted into said cartridge body, said means for rotating including a slider rotatable mounted within a concave portion of said cartridge body for movement together with said shutter.

* * * * *

UNITED STATES PATENT AND TRADEMARK OFFICE
CERTIFICATE OF CORRECTION

PATENT NO. : 5,128,923
DATED : July 7, 1992
INVENTOR(S) : Hasegawa et al

It is certified that error appears in the above-indentified patent and that said Letters Patent is hereby corrected as shown below:

Column 11, line 25, delete ","
Column 12, line 30, after "146B" insert --pushed--.
Column 14, line 57, after "portion" delete ","
Column 15, line 50, after "of" insert --the--.
Column 16, line 6, change "43a" to --43c--.
          line 9, change "43a" to --43b--.

Column 18, line 11, should continue on line 10

Signed and Sealed this

Tenth Day of May, 1994

Attest:

BRUCE LEHMAN

Attesting Officer      Commissioner of Patents and Trademarks